United States Patent
Chow et al.

(10) Patent No.: US 9,871,880 B2
(45) Date of Patent: Jan. 16, 2018

(54) DYNAMIC CACHE ALLOCATION AND NETWORK MANAGEMENT

(71) Applicant: MOBOPHILES, INC., Santa Monica, CA (US)

(72) Inventors: William Weiyeh Chow, Los Angeles, CA (US); Mark Lea Tsuie, Canoga Park, CA (US); Brian A. Truong, Cerritos, CA (US)

(73) Assignee: Mobophiles, Inc., Santa Monica, CA (US)

( * ) Notice: Subject to any disclaimer, the term of this patent is extended or adjusted under 35 U.S.C. 154(b) by 201 days.

(21) Appl. No.: 14/639,096

(22) Filed: Mar. 4, 2015

(65) Prior Publication Data

US 2015/0256639 A1    Sep. 10, 2015

Related U.S. Application Data

(60) Provisional application No. 61/947,982, filed on Mar. 4, 2014.

(51) Int. Cl.
*G06F 15/167* (2006.01)
*H04L 29/08* (2006.01)

(52) U.S. Cl.
CPC .......... *H04L 67/2842* (2013.01); *H04L 67/22* (2013.01)

(58) Field of Classification Search
None
See application file for complete search history.

(56) References Cited

U.S. PATENT DOCUMENTS

| | | |
|---|---|---|
| 6,757,708 B1 | 6/2004 | Craig et al. |
| 6,983,318 B2 | 1/2006 | Doyle |
| 7,096,418 B1 | 8/2006 | Singhal et al. |
| 7,613,792 B2 | 11/2009 | Zervas et al. |
| 7,694,076 B2 | 4/2010 | Lowery et al. |

(Continued)

FOREIGN PATENT DOCUMENTS

CA    2 415 641 A1    1/2002

OTHER PUBLICATIONS

International Search Report and Written Opinion dated Jun. 16, 2015 for corresponding International Application No. PCT/US2015/018826 (12 sheets).

(Continued)

*Primary Examiner* — Brian Whipple
(74) *Attorney, Agent, or Firm* — Lewis Roca Rothgerber Christie LLP

(57) ABSTRACT

A system and method for dynamic caching of content of sites accessed over a network by a user is provided. The system includes a processor, a first storage device for maintaining cache accounts for storing the content of the sites accessed over the network by the user based on activity over the network by the user with the sites, a second storage device for storing statistics, and a non-transitory physical medium. The medium has instructions stored thereon that, when executed by the processor, causes the processor to gather statistics on suitability of the sites for caching based on the network activity, store the caching suitability statistics on the second storage device, and dynamically create, delete, or resize the cache accounts based on the caching suitability statistics.

32 Claims, 14 Drawing Sheets

(56) References Cited

U.S. PATENT DOCUMENTS

| | | | |
|---|---|---|---|
| 8,359,597 B1* | 1/2013 | John | G06F 9/5044 |
| | | | 706/25 |
| 8,584,234 B1* | 11/2013 | Sobel | H04L 67/2852 |
| | | | 726/22 |
| 2001/0056500 A1 | 12/2001 | Farber et al. | |
| 2002/0026563 A1 | 2/2002 | Chamberlain et al. | |
| 2002/0116517 A1 | 8/2002 | Hudson et al. | |
| 2002/0138565 A1* | 9/2002 | Kustov | H04L 29/06 |
| | | | 709/203 |
| 2003/0078964 A1* | 4/2003 | Parrella, Sr. | G06F 17/30902 |
| | | | 709/203 |
| 2004/0044731 A1 | 3/2004 | Chen et al. | |
| 2005/0086292 A1 | 4/2005 | Yee | |
| 2005/0097166 A1 | 5/2005 | Patrick et al. | |
| 2006/0031833 A1 | 2/2006 | Huang et al. | |
| 2008/0228899 A1 | 9/2008 | Plamondon | |
| 2010/0138485 A1 | 6/2010 | Chow et al. | |
| 2012/0110109 A1 | 5/2012 | Luna et al. | |
| 2013/0066983 A1* | 3/2013 | Li | H04W 4/12 |
| | | | 709/206 |
| 2014/0207835 A1* | 7/2014 | Jellick | H04L 41/082 |
| | | | 707/827 |

OTHER PUBLICATIONS

Extended European Search Report dated Jan. 19, 2016 for corresponding EP Application No. 12847114.1, (16 pages).

SIPO Office Action dated Feb. 2, 2016 for corresponding Chinese Patent application 201280055543.2, with English Translation (24 pages).

Australian Office action dated Mar. 24, 2016 for corresponding Australian Patent application 2012334941, (3 pages).

Partial Supplementary European Search Report for corresponding EP Application No. 12847114.1, dated Sep. 22, 2015 (6 sheets).

* cited by examiner

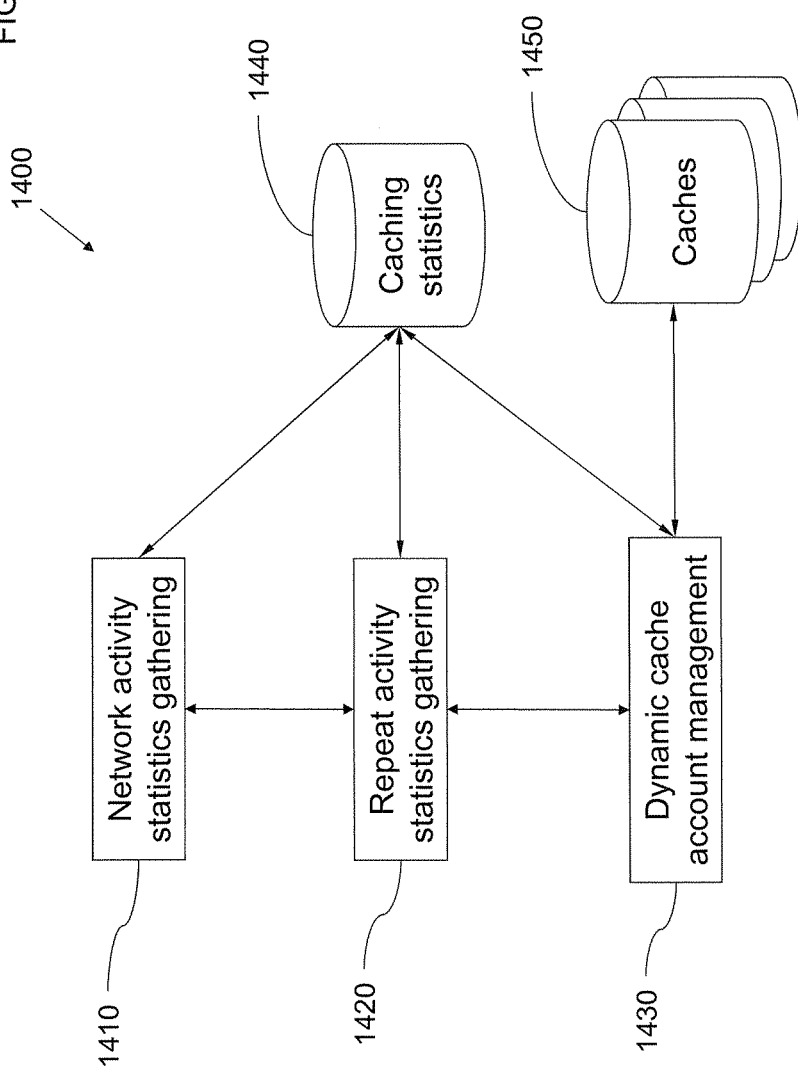

DYNAMIC CACHE ALLOCATION AND NETWORK MANAGEMENT

CROSS REFERENCE TO RELATED APPLICATION

This application claims priority to and the benefit of U.S. Provisional Application No. 61/947,982, filed Mar. 4, 2014, the entire content of which is incorporated herein by reference.

BACKGROUND

1. Field

Aspects of embodiments of the present invention relate to dynamic cache allocation and network management.

2. Related Art

With mobile devices, such as smartphones and tablet computers (tablets), many end users are controlled by data plans that are now capped by tiers. In part, this is because data consumption is growing faster than infrastructure capacity. Further, roaming costs can be exorbitant, such as in Europe (where roaming can be common, such as across national borders). In addition, performance may vary significantly based on coverage and congestion. This can be due, for example, to network coverage, which varies widely by location and wireless carrier.

Carriers are also experiencing negative effects. Network congestion reduces cellular coverage/quality. In effect, cell sites "shrink" to adapt to excessive congestion. In addition, high roaming costs often need to be paid to competitor carriers. This particularly affects smaller carriers, which have to pay more in roaming costs to their larger competitors for out-of-network coverage.

Enterprises may also experience high data plan costs, especially for traveling executives. Alternatives may not be pleasant, such as working more offline, which hurts productivity, particularly for tablet users.

Web sites in turn may have slow/poor user experience due to slower mobile networks and less powerful devices. This may be due in part to cellular latency, which may be high due to cellular connection setup (often one to two seconds). Further, bandwidth costs can be high for web site access, such as for video or audio portions of the web site.

One possible solution to such problems is to have a proxy server reduce the size of server responses by replacing media with lower resolution versions, but this reduces the media quality and the user experience. Another solution is to aggressively connect to any open Wi-Fi network, but it can be dangerous to connect to untrusted networks. A still further solution is to have client/server software provide various WAN optimization techniques, such as data deduplication or lower level packet caching (e.g., TCP), but this requires deploying extensive server-side software or appliances, and is often not as effective as higher level caching (e.g. HTTP) in reducing round-trips/requests to the origin server.

Higher level caching may be done in many ways. For example, the cache can save every response received by the device, managed in a least-recently-used caching protocol. This, however, wastes caching resources for data-intensive applications that do not repeat accesses, as well as crowds smaller application footprints out of the cache in favor of larger application footprints. By contrast, another solution is to employ a separate cache for each application (e.g., software application, or app), but then such caches would not be configurable by the carrier or enterprise, nor would they be able to leverage repeat activity (e.g., favor one application when it exhibits localized repeated requests for the same content) or shared activity between applications for the same content.

SUMMARY

Embodiments of the present invention address these and other issues. Further embodiments address such issues as applied to portable devices (smartphones, tablets, etc.), which have more limited resources (e.g., storage, bandwidth, operating systems) than, for example, desktop computers. Still further embodiments are directed to systems and methods of dynamic cache allocation to make more efficient use of limited network bandwidth and improve latency across the network.

According to an embodiment of the present invention, a system for dynamic caching of content of sites accessed over a network by a user is provided. The system includes a processor, a first storage device for maintaining cache accounts for storing the content of the sites accessed over the network by the user based on activity over the network by the user with the sites, a second storage device for storing statistics, and a non-transitory physical medium. The medium has instructions stored thereon that, when executed by the processor, causes the processor to gather statistics on suitability of the sites for caching based on the network activity, store the caching suitability statistics on the second storage device, and dynamically create, delete, or resize the cache accounts based on the caching suitability statistics.

The caching suitability statistics may include statistics of cacheable activity with the sites by the user. The instructions, when executed by the processor, may further cause the processor to dynamically create the cache accounts based on the cacheable activity statistics.

The cacheable activity statistics may include cacheable requests with the sites by the user or cacheable bytes of the network activity corresponding to the cacheable requests.

The caching suitability statistics may further include statistics of repeat activity with the sites by the user. The repeat activity statistics may include repeat requests with the sites by the user.

The instructions, when executed by the processor, may further cause the processor to identify top ones of the sites based on the caching suitability statistics, and track the repeat requests for the top ones of the sites.

The instructions, when executed by the processor, may further cause the processor to identify the top ones of the sites based on the cacheable requests or the cacheable bytes.

The caching suitability statistics may include statistics of repeat activity with the sites by the user. The instructions, when executed by the processor, may further cause the processor to dynamically create the cache accounts based on the repeat activity statistics.

The repeat activity statistics may include repeat requests with the sites by the user.

The instructions, when executed by the processor, may further cause the processor to identify top ones of the sites based on the caching suitability statistics, and track the repeat requests for the top ones of the sites.

The caching suitability statistics may further include statistics of cacheable activity with the sites by the user. The instructions, when executed by the processor, may further cause the processor to identify the top ones of the sites based on the cacheable activity statistics.

The cacheable activity statistics may include cacheable requests with the sites by the user or cacheable bytes of the network activity corresponding to the cacheable requests.

The instructions, when executed by the processor, may further cause the processor to identify the top ones of the sites based on the cacheable requests or the cacheable bytes.

According to another embodiment of the present invention, a method of dynamic caching of content of sites accessed over a network by a user is provided. The method includes: executing, by a processor, instructions stored on a non-transitory physical medium; maintaining, by the processor on a first storage device, cache accounts for storing the content of the sites accessed over the network by the user based on activity over the network by the user with the sites; storing statistics by the processor on a second storage device; gathering, by the processor, statistics on suitability of the sites for caching based on the network activity; storing, by the processor, the caching suitability statistics on the second storage device; and dynamically creating, deleting, or resizing, by the processor, the cache accounts based on the caching suitability statistics.

The caching suitability statistics may include statistics of cacheable activity with the sites by the user. The method may further include dynamically creating, by the processor, the cache accounts based on the cacheable activity statistics.

The cacheable activity statistics may include cacheable requests with the sites by the user or cacheable bytes of the network activity corresponding to the cacheable requests.

The caching suitability statistics may further include statistics of repeat activity with the sites by the user. The repeat activity statistics may include repeat requests with the sites by the user.

The method may further include: identifying, by the processor, top ones of the sites based on the caching suitability statistics; and tracking, by the processor, the repeat requests for the top ones of the sites.

The method may further include identifying, by the processor, the top ones of the sites based on the cacheable requests or the cacheable bytes.

The caching suitability statistics may include statistics of repeat activity with the sites by the user. The method may further include dynamically creating, by the processor, the cache accounts based on the repeat activity statistics.

The repeat activity statistics may include repeat requests with the sites by the user.

The method may further include: identifying, by the processor, top ones of the sites based on the caching suitability statistics; and tracking, by the processor, the repeat requests for the top ones of the sites.

The caching suitability statistics may include statistics of cacheable activity with the sites by the user. The method may further include identifying, by the processor, the top ones of the sites based on the cacheable activity statistics.

The cacheable activity statistics may include cacheable requests with the sites by the user or cacheable bytes of the network activity corresponding to the cacheable requests. The method may further include identifying, by the processor, the top ones of the sites based on the cacheable requests or the cacheable bytes.

BRIEF DESCRIPTION OF THE DRAWINGS

The accompanying drawings, together with the specification, illustrate example embodiments of the present invention. These drawings, together with the description, serve to better explain aspects and principles of the present invention.

FIG. 14 is an example dynamic caching organization according to an embodiment of the present invention.

DETAILED DESCRIPTION

Figure 1:
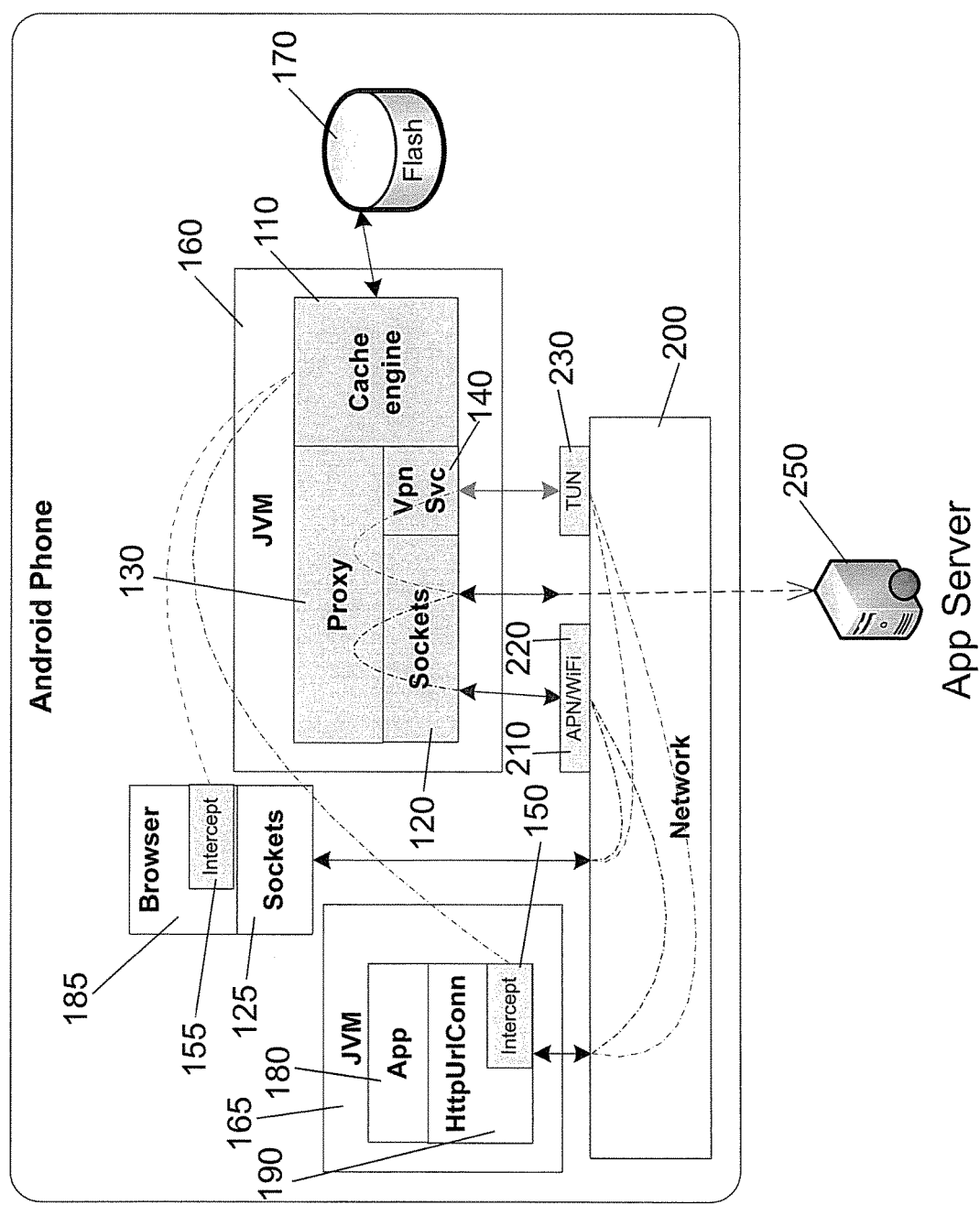
FIG. 1 is an example mobile device (such as a smartphone) architecture suitable for use with a dynamic cache allocation and network management implementation according to an embodiment of the present invention.

Example embodiments of the present invention will now be described with reference to the accompanying drawings. In the drawings, the same or similar reference numerals refer to the same or similar elements throughout. Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

In one or more embodiments, systems and methods of dynamic cache allocation and network management are provided. Example embodiments are described with reference to FIGS. 1-14.

FIG. 1 is an example mobile device (such as a smartphone) architecture 100 suitable for use with a dynamic cache allocation and network management implementation according to an embodiment of the present invention. For instance, the mobile device may be an Android phone. For purposes of illustration, the mobile device will be assumed to be an Android smartphone. Further, while such mobile devices may be capable of supporting many users, for ease of description, it will be assumed that a mobile device is dedicated to a particular user, so the term "user" and "mobile device" (or any computing device used in a personal or portable manner) may be used synonymously throughout.

According to one or more embodiments of the present invention, the general architecture on mobile devices (such as architecture 100) provides for a centralized caching engine 110 that can support requests originating from applications (e.g., mobile apps, or just "apps") from, for example, an application server (or app server) 250 that the mobile device accesses via, e.g., a Wi-Fi or cellular network. This approach enables cached content to be updated across multiple networks (e.g. WiFi and cellular), shared across multiple apps and allows the caching to be centrally managed, although the present invention is not limited thereto. In other embodiments, the caching may be performed in a distributed manner, such as with a caching engine running within each app, where they are operating in a coordinated manner such that the overall caching is effectively centrally managed.

The apps and other programmable components of smartphone 100 may be implemented, for example, as sets of computer instructions stored on a non-transitory storage device of smartphone 100, and configured to be executed on one or more processors of the smartphone 100. The caching engine 110 may also support requests for particular web sites, such as from a web browser. Accordingly, for ease of description, terms such as "application," "app," "web site," or "site" may be used somewhat interchangeably throughout the present application when referring to categories of cacheable content for the caching engine 110.

The caching engine 110 may be engaged from a number of different mechanisms, such as a proxy server (e.g., via operating system (OS) network settings), a virtual private network (VPN) client (e.g., via OS network settings), or an interception layer. See, for example proxy server 130, VPN client 140, or interception layers 150 and 155 in FIG. 1. The caching engine 110 may be run on a Java virtual machine (JVM) 160. The cached content may be stored on a physical storage device, such as flash memory 170 or other nonvolatile storage device. Without loss of generality, such a device may sometimes be referred to as a "disk," though it could be any type of non-transitory storage device, such as a solid-state drive. In addition, the cached content may be stored, in whole or in part, on volatile storage, such as random access memory, and this volatile storage may be used in combination with nonvolatile storage, such as in a tiered manner where the most recently accessed content is stored in faster volatile storage before it is transitioned to slower nonvolatile storage.

The proxy server 130 may run in a variety of form factors, such as an application, kernel driver, or within the OS on the mobile device, and be configured to receive network connections, for example, via OS network settings. In one or more embodiments, the proxy server may run in a JVM, such as the same JVM 160 on which the caching engine 110 runs. The proxy server 130 may act as an intermediary on behalf of client applications. For example, the proxy server 130 may service the request of an app 180 running in another JVM 165.

The app 180 may want to access the Internet using, for example, an Android service such as HttpURLConnection 190. Here, HTTP stands for hypertext transfer protocol and URL stands for uniform resource locator (e.g., a web address). HttpURLConnection 190 may then invoke network services 200 to access the Internet. Network services 200 may access the Internet, for example, using access point name (APN) 210 (e.g., a mobile network such as 3G) or Wi-Fi connection 220. Network services 200 may be configured to route requests from app 180 to proxy server 130 using a proxy configuration applied globally to the system, or to the APN or WiFi connection. Network services 200 may also route requests from app 180 to proxy server 130 using a variety of other ways, for example, via network tunnel (TUN) 230 or IP routing tables (also known as "iptables").

Network services 200 may be configured to specify a proxy directly or indirectly (e.g. as a global system proxy directly detected and used by apps running on the device, or indirectly through a setting on the APN 210 or Wi-Fi connection 220) to access the Internet, such that a request may be sent through a standard communications layer, such as sockets 120 (e.g., a network socket for connecting to the Internet), which is received by the proxy server 130. The proxy server 130, in turn, may make a request to the app server 250 through network services 200 (while bypassing the APN or Wi-Fi proxy configuration to avoid looping back to itself), which services the request and returns any responding communications to the proxy server 130. The proxy server may then cache some, none, or all of the response via the caching engine 110 before returning the response through the network socket 120 to the app 180 through the same described stages in reverse.

In place of making the request to the app server 250, the proxy server 130 may instead service the request from the caching engine 110. For example, if the same or similar request has already been requested of the app server 250, and sufficient response or other relevant data related to the request has been cached via the caching engine 110, then the proxy server 130 can use the cached data to respond to the request of the app 180. This would avoid using networking infrastructure (e.g., wireless communication) and other resources (such as those of the app server 250), as well as reducing the overall cost of providing a response for the request (such as by leveraging the lower power consumption of serving the response from storage versus the higher power consumption of serving it over the cellular radio).

Instead of using a proxy configuration on the APN or Wi-Fi connection, the network services 200 may also be configured to route requests to proxy server 130 through a variety of other means. For example, another approach is using a network tunnel (TUN) 230 to establish a VPN connection, which can route network activity to VPN service 140 to handle the network transmission. The VPN service 140 may then route the request to the proxy server 130 or possibly interact directly with the caching engine 110 to either serve the response from cache or access the app server 250 using the sockets 120 (as appropriate) to service the request and return the response via the network tunnel 230.

Another mechanism for engaging the caching engine 110 is to use an interception layer (such as interception layers 150 and 155) within an app to redirect traffic to the caching process. For example, in the above example, before or in place of having HttpURLConnection 190 invoke network services 200 to access the Internet, HttpURLConnection may have an interception layer 150 intercept the request from app 180 and directly invoke the caching engine 110 to serve responses from its cache. Invoking the cache engine 110 from intercept 150 may be performed through any standard inter-process communications mechanism as would be apparent to one of ordinary skill, such as message queues, named pipes, or shared memory.

In addition to the caching engine 110 operating in a separate process, such as within JVM 160, in other embodiments, the caching engine 110 may be embedded within the requesting process, such as JVM 165 or Browser 185 (such as a web browser). The caching engine 110 may then service the request without the need for any inter-process communications. For example, the caching engine 110 may service the request from the cache (if possible and appropriate) or respond back to interception layer 150, which can then allow the request to go through to network services 200. Network services 200 may then either send the request to the proxy server 130 for handling (if the proxy server 130 is enabled, such as through APN 210, Wi-Fi 220, or network tunnel 230), or network services 200 may send the request directly to the app server 250 (e.g., when not running a separate proxy-based cache engine 110 in JVM 160). Multiple caching engine 110 instances embedded in different apps may share the same cache, such that the same cached content may be accessed across multiple apps.

In another embodiment, if the caching engine 110 cannot service the request, processing continues as described above (e.g., through network services 200). In yet another embodiment, should processing continue through network services 200 after an unsuccessful caching engine 110 intercept, the request is marked so that should a subsequent proxy server 130 handle the request, the proxy server 130 would know not to make a second request of the caching engine 110 for the same response.

In another example, the web browser 185 seeks to access the Internet. Similar to the app 180 above, the web browser 185 may take advantage of the caching engine 110 by a number of different approaches. For example, the web browser 185 may be configured to access the Internet by using network sockets 125, which could then use network services 200 to access the app server 250 and/or the caching engine 110 via the proxy server 130 using, for example, sockets 120 or VPN service 140 as described above. In a similar fashion, interception layer 155 may be added to the web browser 185, which may then intercept the request from the web browser 185 and directly invoke the caching engine 110 to service the request as described above. As another embodiment, the caching engine 110 may be directly embedded with browser 185 so that the caching engine 110 may directly service the request without the need for any inter-process communications. For example, the caching engine 110 may service the request from the cache (if possible and appropriate) or respond back to interception layer 155, which can then allow the request to go through to network services 200.

In further detail, the above techniques may be integrated into existing interfaces, with possible differentiation between Secure Sockets Layer (SSL, e.g., encrypted) communications and non-SSL (e.g., unencrypted) communications. Integration with applications may be enabled for non-SSL communications, for instance, in a centralized location in the network stack. For example, proxy server 130 may be configured as the proxy for all or a subset of network protocols, such as only for HTTP, HTTPS, or both. Similarly, proxy server 130 may be configured as the proxy for all or a subset of network interfaces, such as for cellular, WiFi, or both. For example, for APN 210 access, the cellular access point may be set to the proxy server 130. For iptables access, the corresponding Internet Protocol (IP) routing table entries may be set. For VPN service, the VPN client (such as VPN service 140) may route traffic to the proxy server 130. For Wi-Fi, the proxy server 130 may be set for each Wi-Fi access point (AP).

In addition, integration with applications that use SSL communications may require access to unencrypted network data. There are a number of approaches that can be used here. For a man-in-the-middle approach, SSL may be terminated by impersonating the server via a trusted certificate authority (CA). For a software development kit (SDK) approach (such as with the interception layer 155 in FIG. 1), build-time linking with hooks to the caching engine 110 can be used above the SSL encryption. For a relink approach, existing apps can be decompiled and relinked to use custom replacement application programming interfaces (API's), such as with HttpURLConnection 190. For a substitute approach, such as with a browser like web browser 185, an alternative version of the app can be provided where the interception is already wired in. This may be particularly appropriate for widely used open source apps.

As illustrated in FIG. 1, the caching engine 110 may be invoked in one or more places in the software stack, and it may be ineffective, inefficient, or even counterproductive to invoke more than one instance of the caching engine 110, such as applications that have their own embedded instance of the caching engine 110, each running concurrently on the mobile device 100 with the proxy server 130. Accordingly, in one embodiment, when caching is already performed in one instance, such as by a caching engine 110 embedded directly in the app (e.g., above the local proxy server 130), caching can be disabled for downstream instances, such as in the proxy server 130 where proxy lookup for cache misses from the app are disabled to avoid double lookup overhead. For example, headers can be added to requests that have already been processed an one instance of caching engine 110, such as by apps with their own embedded caching engine 110, thus alerting other instances of caching engine 110, such as in the proxy server 130, to avoid redundant cache processing overhead on these requests.

Figure 2:
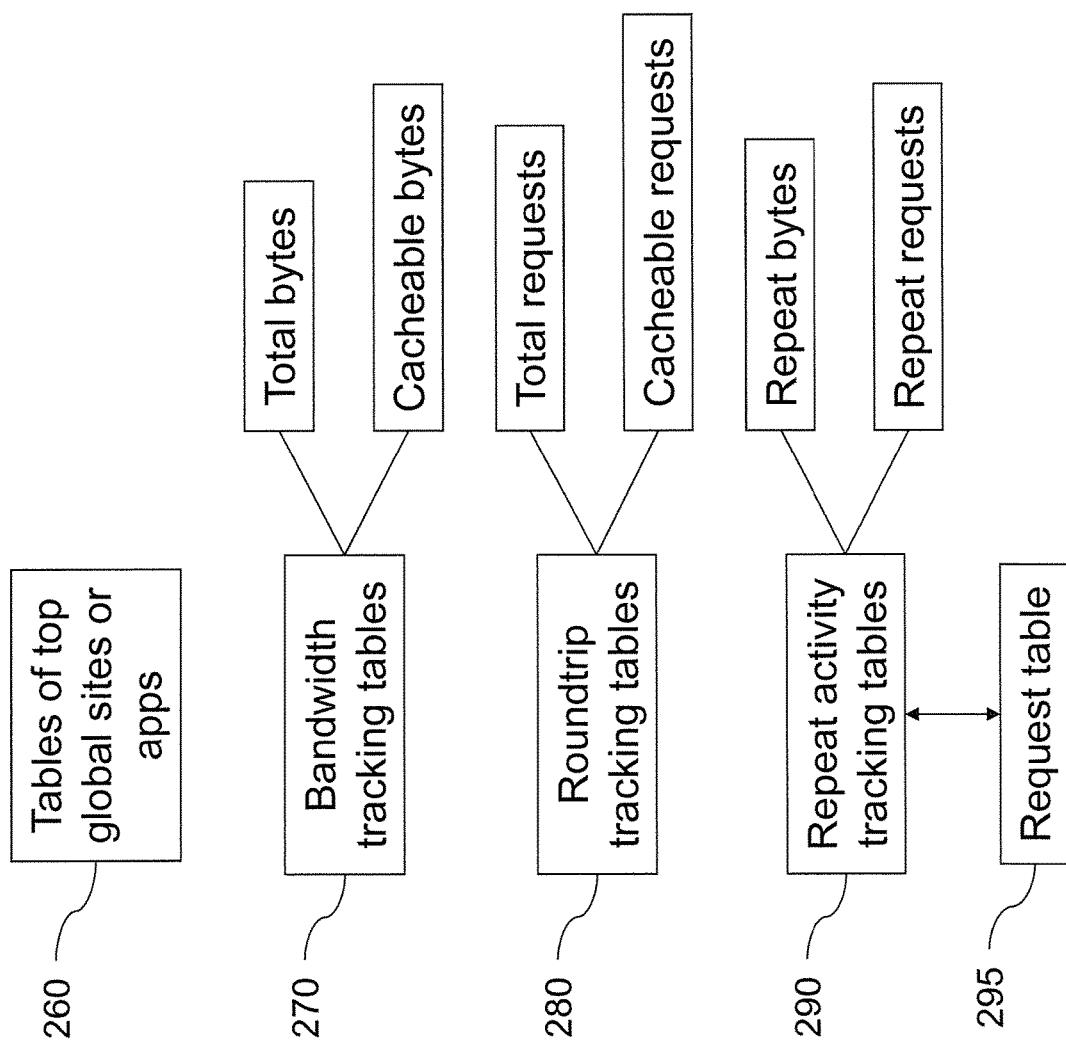
FIG. 2 is an example data set suitable for use with a dynamic cache allocation and network management implementation according to an embodiment of the present invention.

While FIG. 1 is directed mostly to the architecture 100 of a mobile device, dynamic cache allocation and network management may also entail other components, such as software components configured to run on one or more processors of mobile device 100. FIG. 2 is an example data set suitable for use with a dynamic cache allocation and network management implementation according to an embodiment of the present invention.

In FIG. 2, one or more tables 260 of apps or web sites may be built or otherwise made available to the smartphone 100. These tables 260 may include, for example, the top global web sites or apps. Such tables 260 may provide guidance to the caching engine 110 on which applications to cache and how much space to allocate for caching for each application. For example, the tables 260 may be built from network usage analysis of many mobile devices, identifying those widely used apps or frequently accessed web sites that benefit the most from caching. This helps set default rules in place for dynamic cache allocation and network management that can then be customized to the particular user or mobile device 100.

For example, many users will have significant activity for a few apps or web sites that are not in the top global ranking tables 260. Accordingly, in one or more embodiments of the present invention, one or more dynamic cache allocation tables, such as bandwidth tracking tables 270, roundtrip tracking tables 280, and repeat activity tracking tables 290, are provided to facilitate the automatic addition/deletion of caches. These tracking tables allow for dynamic cache allocation using different caching policies. This, for example, may allow an ideal or near ideal set of dedicated caches to be automatically configured for each individual user. For instance, this may enable optimization when individual user activity (such as their most active sites) either differs from one another, or changes over time.

The tracking tables may allow dynamic determination of multiple aspects of cache allocation, including, for example, which applications or web sites to cache and how much space to allocate for each app or web site that is cached. The choice of which caching policy (e.g., for example, which tracking table) to use may vary from app to app or from time to time, depending on factors such as which policy appears to be most efficient for a particular app or time.

In one embodiment, the bandwidth tracking tables 270 provide aggregate counters for both total bytes transferred as well as the number of such bytes representing cacheable bytes (e.g., bytes that are capable of being cached, such as HTTP response data accessed via the GET method from a particular web site). The counters may be broken down by web site, app, etc. (or just "site" for convenience of description), with separate counters for each site. Such bandwidth tracking tables 270 may provide good breakdowns of how the network load is distributed across different sites as well as what proportion of that load may benefit from caching.

In one embodiment, the roundtrip tracking tables 280 provide aggregate counters for both total requests as well as the number of such requests representing cacheable requests (e.g., requests that are capable of being cached, such as requests for downloading data from a particular web site). The counters may be broken down by site as with the bandwidth tracking tables 270. Such roundtrip tracking tables 280 may provide good breakdowns of how the total network latency is distributed across different sites or the distribution of sizes for different responses, particularly for sites for which relatively few bytes are transferred, as well as what proportion of that latency or the number of responses that may benefit from caching.

In one embodiment, the repeat tracking tables 290 provide aggregate counters for tracking repeat activity, such as by bytes transferred or requests made. Repeat activity may represent, for example, bytes transferred or requests made for the same data transferred or the same requests made earlier. Thus, just as cacheable bytes or requests provides an indication of what proportion of the total bandwidth or number of requests are eligible for caching, repeat bytes or requests provides an indication of what proportion of the total bandwidth or number of requests would actually benefit from caching. Repeat activity tracking also identifies sites with high bandwidth but little or no repeat activity (such as streaming video sites).

While repeat activity thus represents a useful statistic for deciding cache allocation by site, repeat activity is more difficult to track than bandwidth or roundtrips. This is because repeat activity depends on the previous requests made and data returned, whereas the bandwidth and round-trip counters may be aggregated independently of the previous requests. This "learning period" for tracking repeat activity thus adds complexity to the tracking (e.g., time and storage to track which requests are being made, so that future repeat requests for the same data can be identified).

For example, tracking repeat activity may entail maintaining a request table 295 of previous requests made and details about their responses (and/or information representative of the requests and their responses, such as subsets or hash values). Further, this complexity grows with the number of previous requests and the amount of information stored for each request (e.g., the size of the request table 295), which in practical embodiments imposes a limit on the number of previous requests that can be maintained for detecting repeat activity. The benefits may be equally rewarding, however, for repeat activity can provide good indications of attainable cache hit ratios (e.g., the percentage of requests or bytes capable of being serviced out of the cache).

Figure 3:
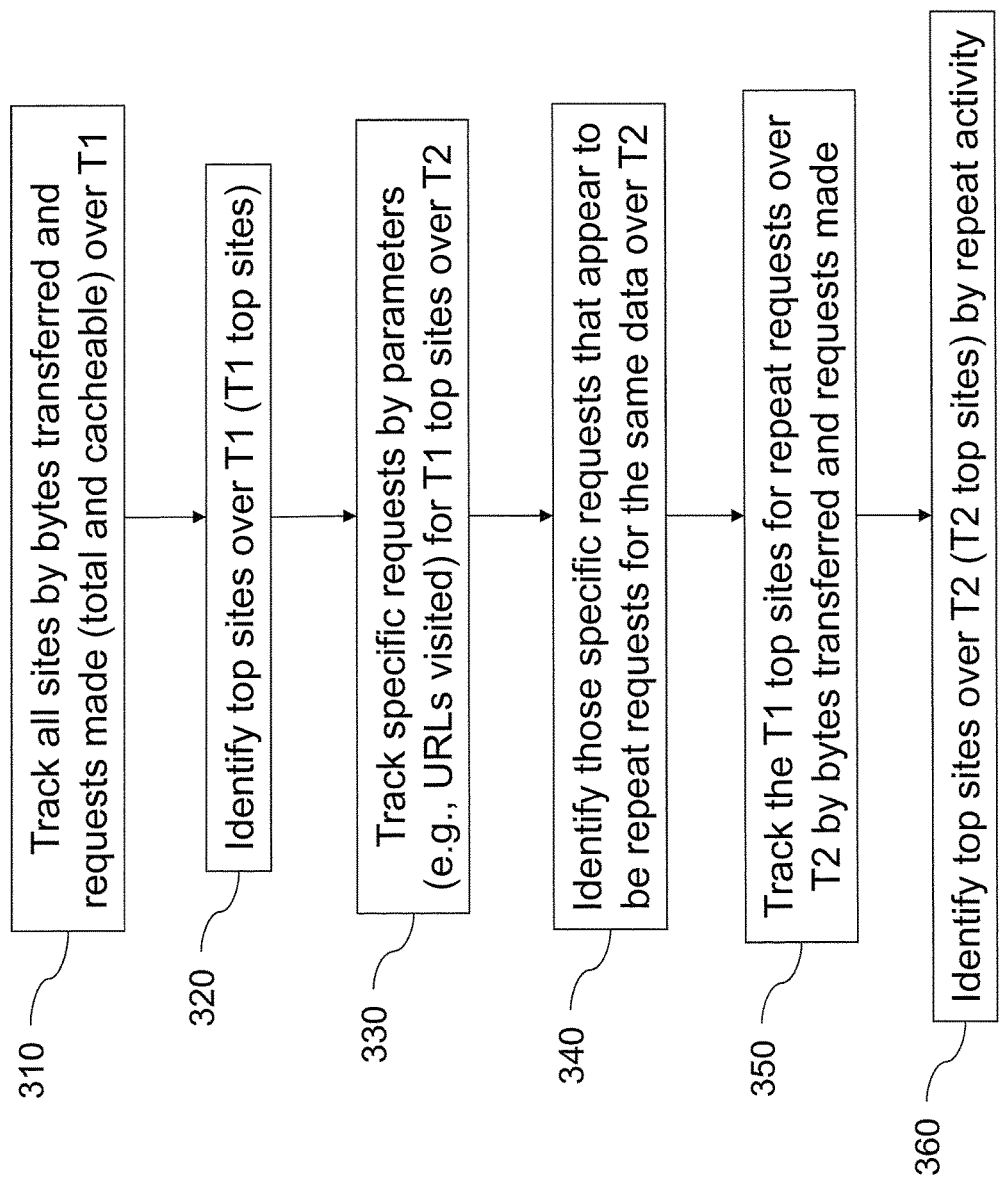
FIG. 3 is an example method of tracking repeat activity according to an embodiment of the present invention.

FIG. 3 is an example method of tracking repeat activity according to an embodiment of the present invention. This and other methods disclosed herein may be implemented, for example, as a series of computer instructions to be executed by a processor (or other computing device), such as a microprocessor. To address the complexity issues of repeat activity tracking, in step 310 of the method of FIG. 3, all sites are tracked by, for example, bytes transferred and requests made (broken down by total and cacheable bytes/requests), over a first period of time T1.

From these counts, in step 320, the top sites (T1 top sites) are identified (for example, those sites having the largest number of cacheable requests and/or the most number of cacheable bytes transferred over the first period of time T1). The T1 top sites are thus a set of sites that appear to be the most likely to benefit from caching. T1 should be chosen long enough that most or all of the sites a user may be actively using are obtained. In one embodiment, T1 may be unbounded such that all sites are tracked in perpetuity for cacheable requests and bytes. In another embodiment, T1 may represent a sliding time window where old activity is dropped/excluded so that the ranking of T1 top sites better reflects current activity by the user.

In step 330, the individual requests or other parameters (e.g., URLs visited, parameters or headers sent, data returned), are tracked for these T1 top sites over a second period of time T2. As mentioned earlier, repeat tracking can be time and storage intensive. Thus, the more sites that are tracked for repeat activity, the more time that is spent performing this tracking and the fewer the number of requests that can be tracked for each site being tracked, which in turn compromises the accuracy of the repeat tracking. Thus, tracking too many sites concurrently for repeat activity may be counterproductive, so in the method of FIG. 3, only the T1 top sites are tracked during T2 for repeat activity. The rationale is that even those sites that have high repeat activity but that are not in the T1 top sites do not make enough of a contribution to the total caching to be worth doing repeat tracking during T2. From these requests, in step 340, those requests that appear to access the same data (for example, have the same parameters or responses) over the second period of time T2 are identified.

In step 350, the repeat requests over the second period of time T2 are aggregated by site (T1 top site) by both bytes transferred and requests made. From these counts, in step 360, the top sites (T2 top sites) by repeat activity over the second period of time T2 are identified (for example, those T1 top sites making the most number of repeat requests for the same data, and/or transferring the most number of bytes for repeated requests). The method of FIG. 3 thus employs a two-stage approach to identifying those sites most likely to benefit from caching, namely identifying the most active sites (e.g., most data transferred or requests made) over the first period of time T1 (the T1 top sites), and then selecting from the most active sites those sites having the most repeat activity (e.g., most repeat requests or most data transferred from repeat requests) over the second period of time T2 (the T2 top sites).

T2 should be chosen to be sufficiently long that enough repeat activity is tracked among the T1 top sites. As discussed earlier, however, repeat activity is not as easy to track as total or cacheable bytes or requests are to track. Not only is there the concern about tracking a significant amount of information for each request, but just what information to track about each request also has to be considered when tracking repeat activity. Accordingly, T2 should also be chosen to not be too long for a variety of reasons, such as to ensure it only reflects the user's current activity (which can change over time) as well as to avoid the storage/computation overhead of tracking old requests that are not (or no longer) being repeated.

In further detail, repeat activity may be uniquely identified using the various contents of the requests themselves. Most HTTP requests may be easily identified based upon, for example, their URLs and one or more components of their headers or body. Accordingly, in one embodiment, a fast approach is to calculate a "lookup key" for the cached responses that may be based upon a hash of the request or response components. To be effective, the lookup key should be unique (for example, as would be apparent to someone of ordinary skill, that there are a variety of cryptographically secure hashing functions that can be used to achieve this goal).

Care should be exercised in selecting which components to use, however, for some (e.g., timestamp or view count carried as a query string argument in the URL) may have no effect on the response, but may make a request appear to be unique and not a repeat. This can cause cache lookup misses and redundant copies of the same response when these extraneous components change between multiple requests for the same response. For example, these extraneous components can be filtered out of the cache lookup via, for example, rules specified in configuration settings specified either by the software package, the user or centrally managed by an administrator.

The determination of which parameters affect the response may entail tracking the response as well, to compare which responses are in fact identical. As with the request, the response may also be tracked in a variety of ways, such as being hashed to save space, since secure hash functions are unlikely to ever return the same hash value for different responses.

With these considerations in mind, FIGS. 4-5 and 6-7 are example methods of detecting repeat activity according to embodiments of the present invention. As discussed earlier, detecting repeat requests may involve the interaction of two separate comparison processes: comparing the requests versus comparing the corresponding responses. Approaches may differ, then, by which comparison is done or which one is performed first.

Figure 4:
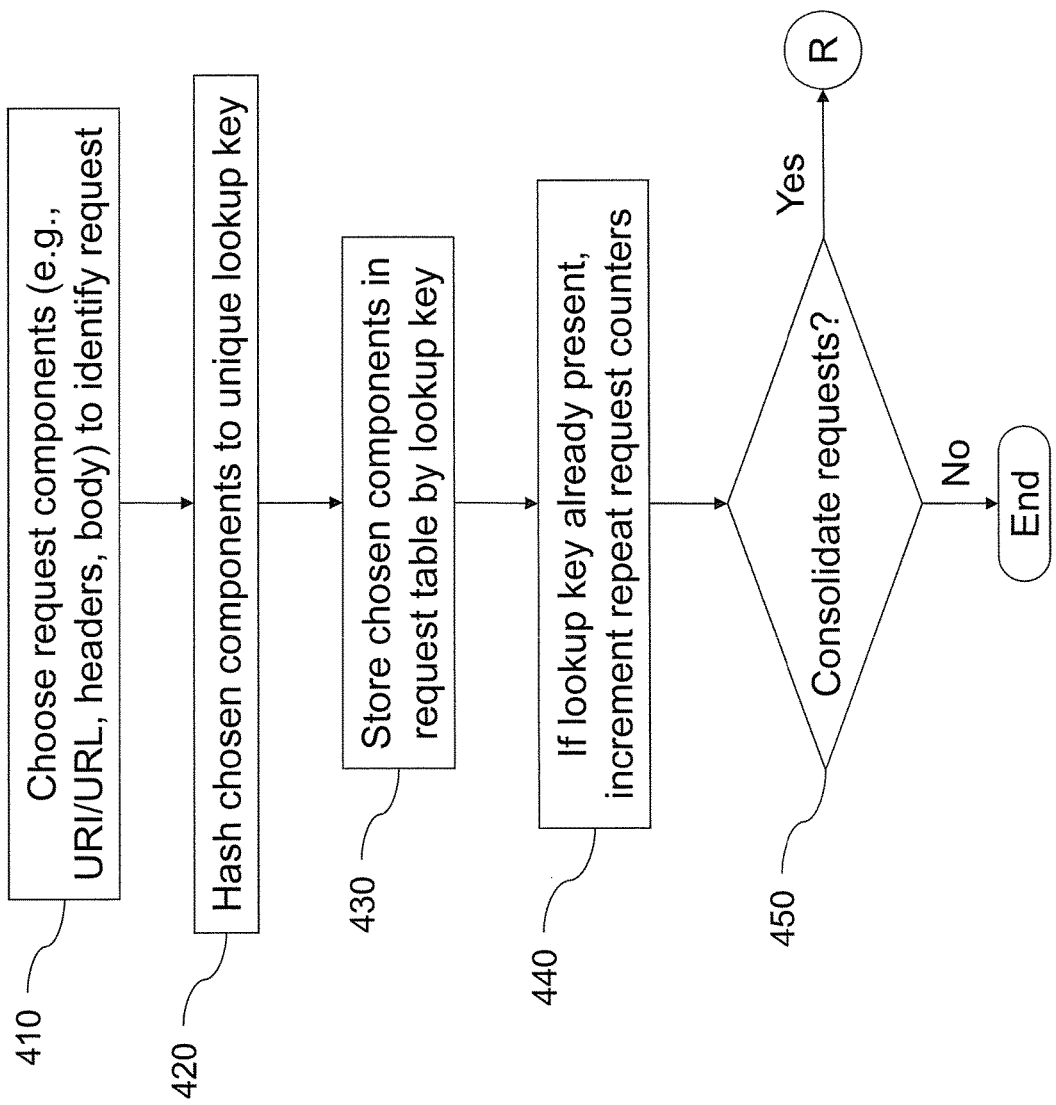
FIGS. 4-5 and 6-7 are example methods of detecting repeat activity according to embodiments of the present invention.
Figure 5:
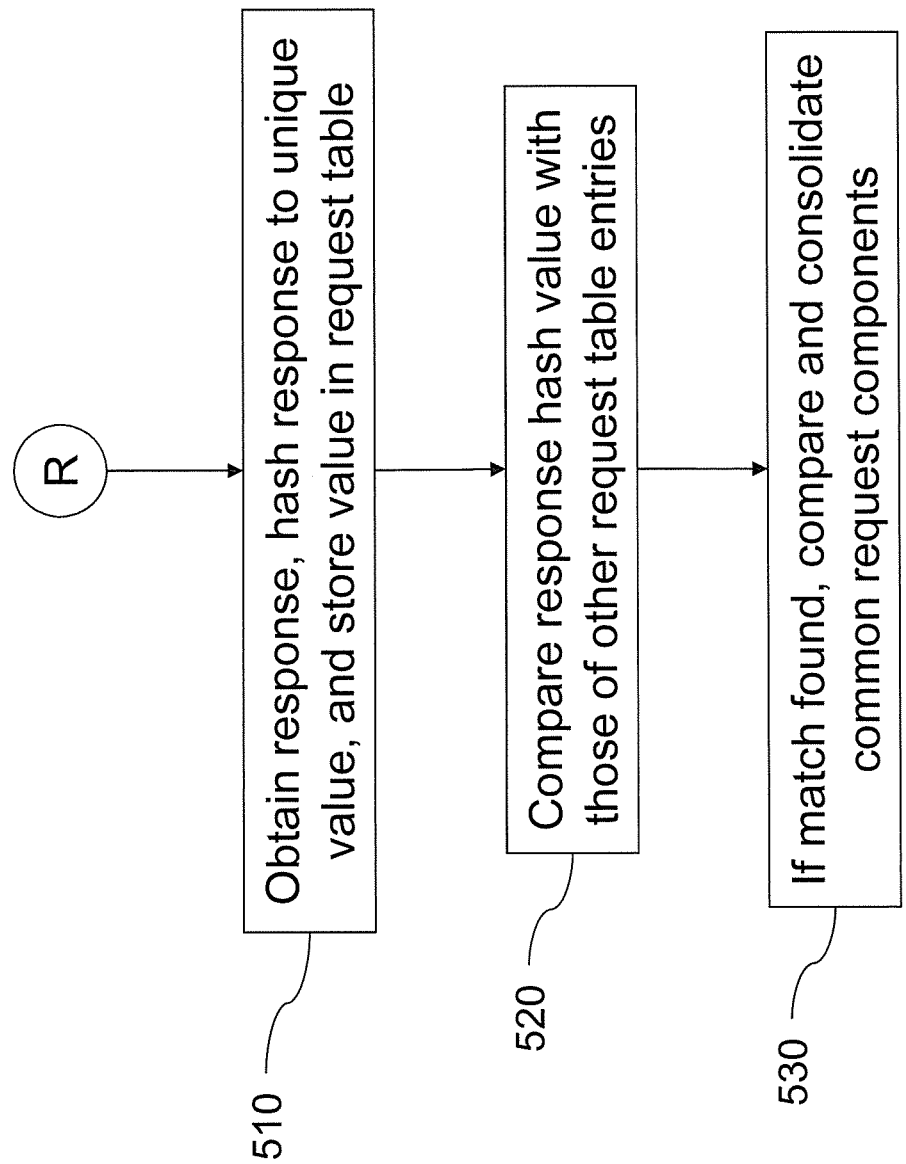

In the detecting repeat activity method of FIGS. 4-5, requests are the primary basis of comparison. That is, the request table is indexed by request (such as a hash value of the request parameters). In step 410, requests are uniquely identified by considering some or all of the request components, such as (for HTTP requests) URI/URL, headers, body, etc. As this may produce a string of unbounded length, in step 420, the chosen components are hashed by a suitable hashing function to produce a sufficiently unique lookup key. In other embodiments, a server-provided unique identifier (e.g., a cookie or an ETag, such as an HTTP entity tag or other tag to uniquely identify the content of a URL) may be used in place of the hashed value. In step 430, the entry is added to the request table by its lookup key. If the entry already exists (e.g., the same lookup key is already present), then in step 440, the appropriate repeat request counters are incremented (such as the number of repeat bytes and the number of repeat requests).

Optionally, such as in some embodiments, similar requests may be consolidated to match them to the same response, which improves cache utilization, as well as other benefits (e.g., to save space). However, such consolidation may be a computationally expensive operation to perform. Accordingly, at step 450, the decision of whether to consolidate similar requests is made or otherwise determined, such as based upon a configuration setting or some heuristic (e.g., a high number of different but similar requests are seen). If similar requests are not being consolidated, processing ends. Otherwise, processing continues in FIG. 5 and step 510, where the response to the request is obtained for identifying requests with different request components that are actually equivalent in that they correspond to the same response. While the response could be stored in the request table, the response may be large, which may compromise the size of the request table. Further, the comparison to other responses may take longer if the full responses are used for comparing. Accordingly, the response may be hashed by a suitable hash function to a sufficiently unique value, and that value stored in the request table.

In step 520, which may be performed immediately at the time a response is seen or periodically afterwards, the hashed response values may be compared to each other. If any of the response hash values are the same as any others, then in step 530, the corresponding request components may be compared, to identify those request components that do not affect the response to determine which ones can be filtered out (e.g., deleted, ignored) so that equivalent requests can be identified with the same lookup key. Further, the corresponding request table entries can be consolidated with the common components and response hash values (possibly obtaining a new lookup key in the process for the common entry, and deleting the previous entries). In this way, the system can learn which request components affect the response and which can be ignored.

Figure 6:
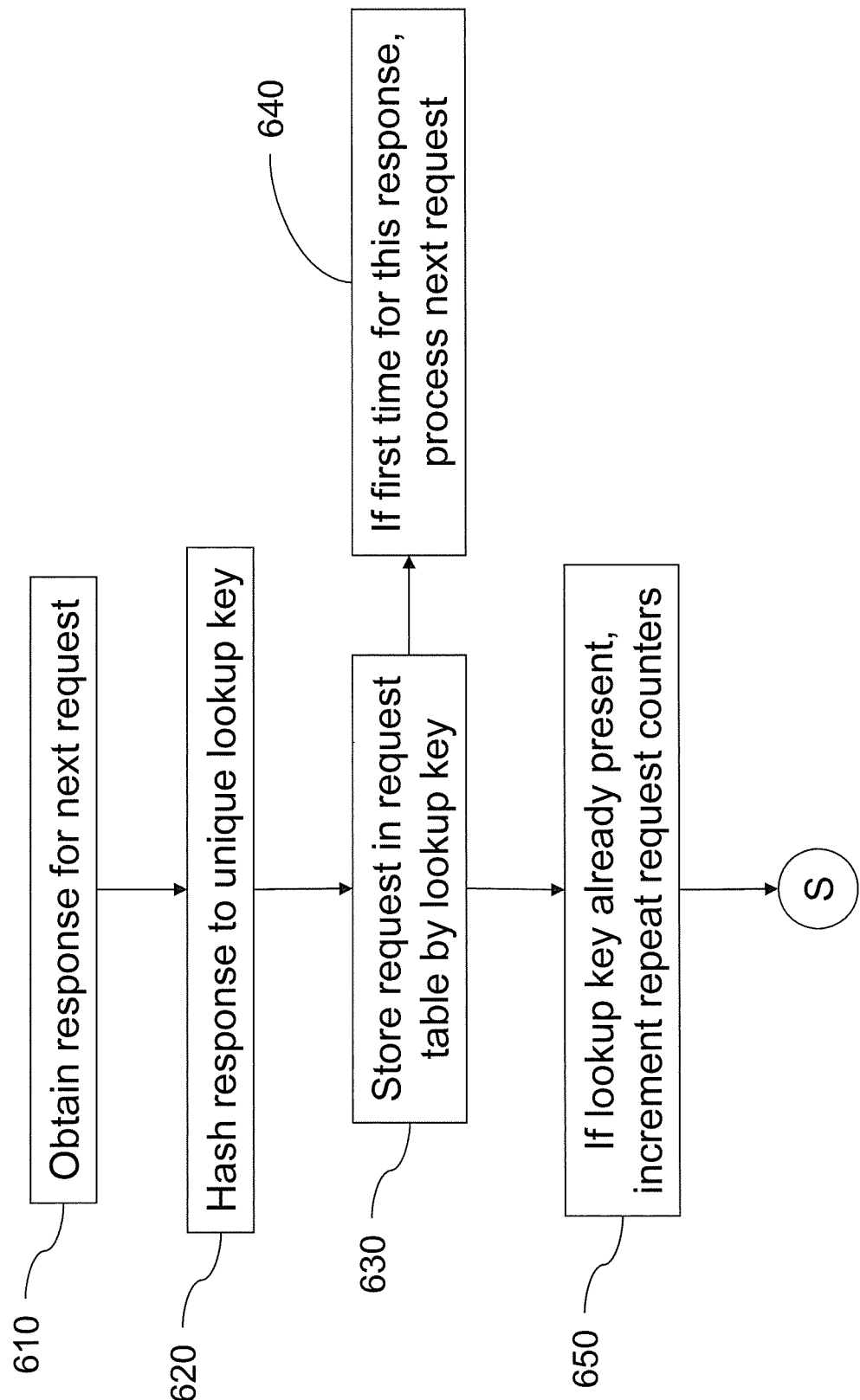
Figure 7:
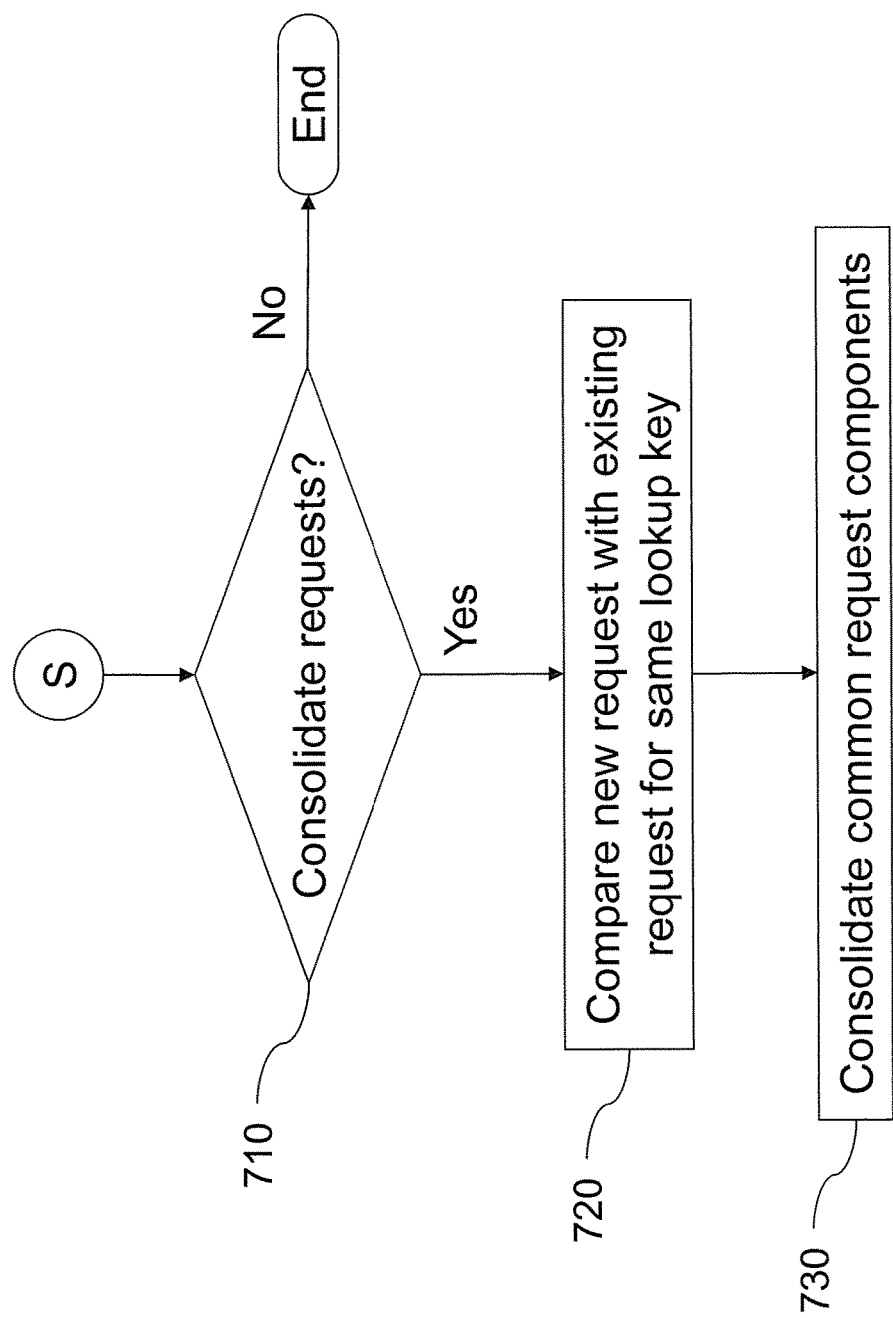

In contrast to the detecting repeat activity method of FIGS. 4-5, in the detecting repeat activity method of FIGS. 6-7, responses are the primary basis of comparison. That is, the request table is indexed by response (such as a hash value of the response). In step 610, the response is obtained for the next request. In step 620, the response is hashed by a suitable hash function to produce a sufficiently unique lookup key. In step 630, the request is stored in the request table using the lookup key from its corresponding response. If this is the first entry with this lookup key (e.g., the response has not been tracked before), then processing resumes with the next request (step 610).

Otherwise, the lookup key is already present, so in step 650, the repeat request counters are incremented (such as the number of repeat bytes and the number of repeat requests). Optionally, such as in some embodiments, similar requests may be consolidated to match them to the same response, which improves cache utilization, as well as other benefits (e.g., to save space). However, such consolidation may be a computationally expensive operation to perform. Accordingly, and continuing to FIG. 7, at step 710, the decision of whether to consolidate similar requests is made or otherwise determined, such as based upon a configuration setting or some heuristic (e.g., a high number of different but similar requests are seen). If so, then processing proceeds to step 720, where the response is used to find previous requests with the same lookup key, and the requests are compared (using the existing stored request having the same lookup key in the request table). In step 730, common request components between the same requests are consolidated, and those request components that do not appear to affect the response can be filtered out (e.g., deleted, ignored).

With either method of FIGS. 4-7, the system is able to track repeat activity and it can also learn over time which request components are important for affecting cache responses, which allows the system to better manage the dynamic cache allocation.

A goal of tracking repeat activity is to maintain an up-to-date view of the top sites with repeat activity, where being "up-to-date" means that it reflects a high likelihood that the user will revisit the content on these sites in the near future. This means that the ranking needs to adapt to changes to the "top" apps or sites that a user might be accessing. With this in mind, there are several types of sites for which repeat activity may be taking place. These include, for example, work apps/sites (such as SharePoint, company intranets, HR (human resources), etc.), casual/favorite sites (such as WSJ (Wall Street Journal)), bursty sites (such as NCAA.com or Olympics.org), and so on.

Work apps/sites may be characterized, for example, as being accessed less frequently over a short period than perhaps favorite sites (e.g., every other day), but consistently over a long period. Such sites often contain large static content that changes infrequently (e.g., PPTs (PowerPoint presentations), videos, etc.) A caching goal for such sites may be to keep cached content even if not accessed for many days, since it will likely be accessed again in the near future.

A possible caching approach for such sites is to rank these sites by total repeat cached bytes.

Casual or favorite sites may be characterized, for example, as being visited regularly with visits separated by a few days or up to a week. These sites often contain large static content that changes frequently (e.g., images, videos, etc.) A caching goal for such sites may be to try to keep their content cached, but these sites are less valuable than sites with static content that change less frequently. Here, a possible caching approach may factor in total repeat requests.

Bursty sites may be characterized, for example, as being sites that are visited regularly by a user but only during relatively brief periods, like NCAA.com, which is a Top 20 site during just March/April (e.g., coinciding with the National Collegiate Athletic Association (NCAA) basketball tournament). Such sites may have multiple accesses occurring repeatedly across multiple days, similar to a user's casual/favorite sites. A caching goal for such sites may be to enable caching quickly for them at the start of this high activity period (within a day or two of active use) and then to disable caching for them similarly quickly at the end of the high activity period. In this case, a possible caching approach may be to detect high activity across a multi-day window.

A way to support this repeat activity tracking is to measure activity for a domain or app over a timeframe, where the timeframe may be configurable or dynamic and/or the measurement may weigh activity differently depending on how recently the activity occurred. For example, the timeframe considered can be limited to a recent subset to yield a moving average, and this value can then trigger creating, deleting, or sizing a dedicated cache as it changes over time. To be more specific, a threshold may be established for this average, either fixed/configurable or dynamic/self-adjusting, where exceeding the threshold will allow caching to be enabled automatically. This may be described through a comparison of different averages, such as cumulative, simple moving (SMA), or weighted moving (WMA).

Cumulative averages represent unweighted averages across all historical activity. Such averages "remember" old favorites, in that such sites may go unaccessed for several days, but they may still show up in the top cumulative averages because of sustained activity over long periods. On the other hand, it may take a long time (possibly weeks) to forget old sites that are no longer being accessed. Accordingly, work apps/sites (as described above) may benefit the most from using cumulative averages (as they are consistently accessed over time), but bursty sites are not characterized well by cumulative averages, as they take a long time before their frequent accesses become noticed, and on the other end, such sites may continue to show up with high cumulative averages long after they are no longer being accessed.

Simple moving averages (SMA) represent unweighted moving average across the last N days of activity (for some reasonably small period of time, like a couple of weeks). SMA may adjust to new favorites faster than cumulative averages (since there is much less historical data obscuring the recent access), but they may still take multiple days to detect new favorite sites. Accordingly, bursty sites perform better with SMA than with cumulative averages since such sites are more quickly detected and more quickly forgotten with SMA than with cumulative averages.

Weighted moving averages (WMA) are similar to SMA, except that as their name implies, they represent weighted moving averages across the last N days of activity. The weights skew more of the average to activity of recent days than activity of older days (such as closer to N days old). There are a variety of weighting options, such as linear or exponential. With linear weighting, the contribution of an access decreases linearly over time, so that a recent access may be weighted at 100%, with the weighting percentage decreasing linearly at 5% per day over a 20-day period, at which point the access is no longer tracked.

On the other hand, with exponential weighting, the contribution of an access decreases exponentially over time, such as 50% every two days. That is, a recent access is weighted at 100%, a two-day old access is weighted at 50%, a four-day old access is weighted at 25% (i.e., half of 50%), a six-day old access at 12.5% (i.e., half of 25%), and so on, with a 20-day old access at 0.1%, at which point the access may safely be ignored (e.g., treated as 0%), as the contribution is unlikely sufficient enough to affect the repeat activity tracking.

Bursty sites perform significantly better with WMA, particularly with exponential weighting. This is because exponential weighting has the shortest "warm up" period (to learn about new top sites) of the above-described averaging techniques. However, exponential weighting can discard old favorites too quickly (such as within a day or two, depending on the weighting).

Figure 8:
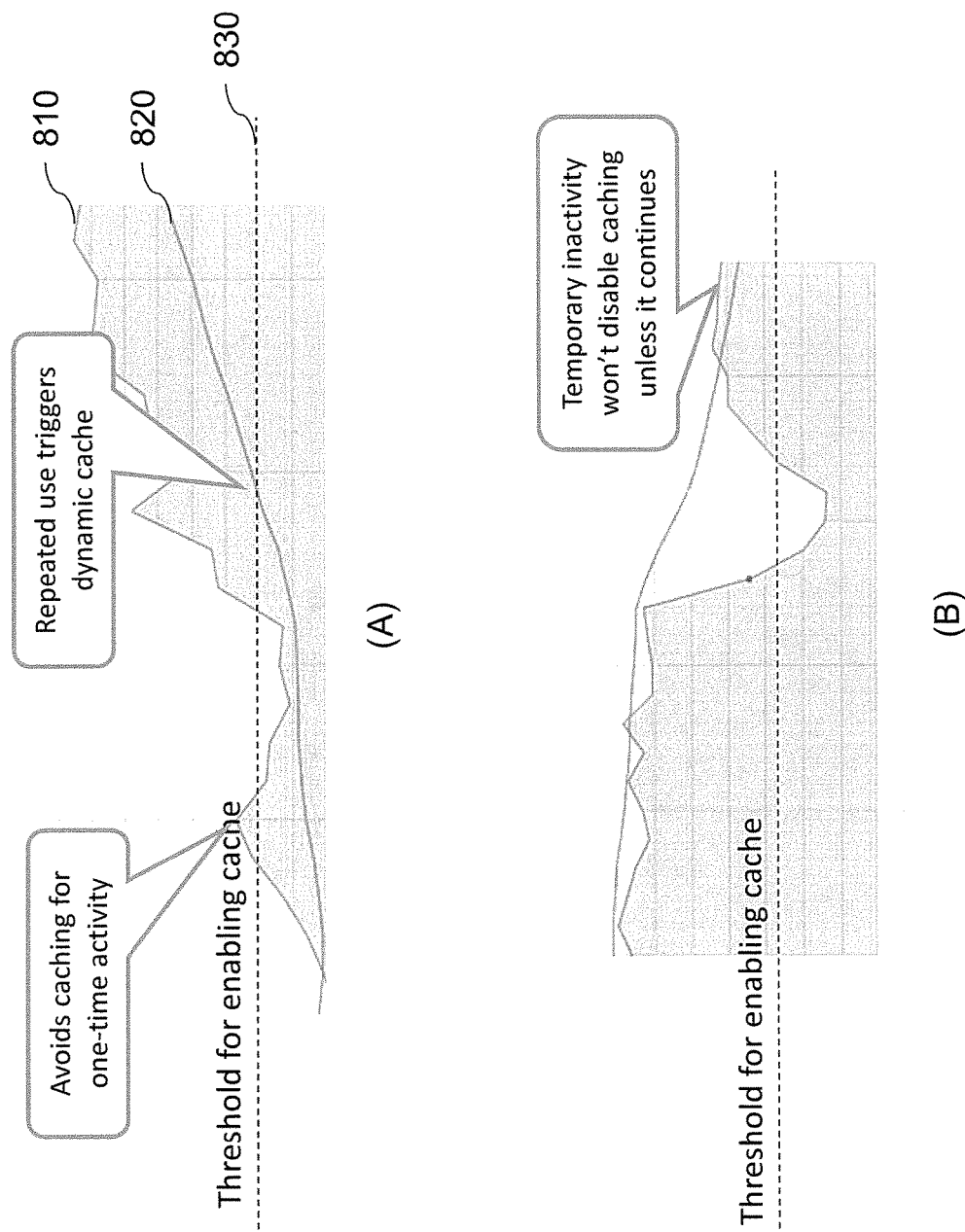
FIG. 8 contains two graphs illustrating example cache access weighting and activation/deactivation according to an embodiment of the present invention.

FIG. 8 contains two graphs illustrating example cache access weighting and activation/deactivation according to an embodiment of the present invention. In FIG. 8A, line 810 represents the accesses (bytes or requests, y-axis) for a particular (cacheable) site over time (x-axis). These are instantaneous accesses. By contrast, line 820 represents an average access rate over time, such as with one of the above-described average access rates. Finally, line 830 represents a threshold for enabling/disabling caching of the particular site. When the average access rate 820 goes above the threshold 830, the site is made eligible for caching, while when the average access rate 820 goes below the threshold 830, the site is made eligible for disabling the caching.

In FIG. 8A, initial activity does not trigger dynamic enablement of the cache, but continued repeat activity pushes the average up to enable caching. In further detail, as can be seen in the left side of FIG. 8A, momentary spikes in the access rate 810 above the threshold 830 do not activate caching (since the average access rate 820 remains below the threshold 830). However, as can be seen in the right side of FIG. 8A, sustained access rates 810 above the threshold 830 do activate caching (since the average access rate 820 starts "catching up" and goes above the threshold 830).

By contrast, FIG. 8B uses the same three lines as FIG. 8A, only the situation is reversed. In FIG. 8B, initial inactivity does not trigger immediate disablement of a cache, but continued repeat inactivity can push the average down to ultimately disable caching: In further detail, in FIG. 8B, caching is initially enabled for the site, with a high average access rate (significantly above the threshold). However, the access rate for the site is starting to decrease over time. In fact, just past the halfway point in time, the access rate falls below the threshold, but the dip is not long enough to drop the average access rate below the threshold and disable caching. Nonetheless, if the access rate continues to fall in FIG. 8B, eventually the average access rate will fall below the threshold and disable caching for the site.

Tracking repeat activity may require monitoring specific requests and it may be expensive or prohibitive to do so for every network request performed. The tracking may be optimized to selectively track repeat activity for a top site/server or a top app, where the general goal is to identify the sites/apps that have enough activity to be worthwhile for tracking, such that they may later dynamically trigger caching to be enabled. There are various approaches for determining a "top" site or app, such as identifying whether there is sufficient cacheable activity (e.g., requests or bytes).

For heavy users, it may also be desirable to limit how many total sites or apps are being tracked, to limit the total overhead for computation and storage for tracking repeat activity tracking. For example, it may be desirable to only enable repeat activity tracking for the top X sites, in terms of total cacheable activity. It may also be desirable to limit the timeframe of the activity being considered for identifying a top site/app, for reasons similar to limiting the timeframe for repeat activity tracking. For example, it may be desirable to only consider or overweight recent activity over older activity. It may also be desirable to consider additional conditions before enabling repeat activity tracking for a top site/app. For example, if a site/app exceeds (or does not exceed) a certain threshold, which can be configurable or dynamic, then repeat activity tracking can be enabled (or not enabled, respectively).

The following approaches can be leveraged or combined, in conjunction with a configurable or dynamic threshold, to determine whether a site or app has enough activity to justify the tracking of repeat activity: by number of requests, or by response bytes. "By number of requests" refers to ranking each site by the total number of cacheable requests to the site. This activity may take place over particular timeframe (e.g., number of cacheable requests over the last X days). While this may help identify sites with significant latency, latency may be a secondary consideration to bandwidth savings, such as for cellular and other wireless networks with spectrum-limited capacity.

In contrast, "by response bytes" refers to ranking each site by the total cacheable response bytes from the site. Again, this activity may take place over a particular timeframe (e.g., total cacheable response bytes over the last X days). While this may help identify sites consuming the most bandwidth, it may be skewed by infrequent (or one time) large downloads. As a further implementation consideration, it may be more prudent to calculate top sites/apps on a periodic basis, to help minimize overhead and avoid constant reranking.

It would be advantageous to size caches based upon activity, so that storage space, which may be very limited on a mobile device, can be intelligently assigned to a site or app to maximize efficient use of it. This is possible by collecting and leveraging information about the cacheability of the site/app, such as the amount of repeat activity performed recently or whether cache hit ratios improve by increasing the cache size. There are many possible approaches to deciding on cache sizing, such as by total cacheable bytes or by repeat cacheable bytes.

With total cacheable bytes, the cache size is limited based on how much cacheable content has been seen recently (e.g., cacheable bytes seen over the last X days). This is more efficient than a simple cache size limit (such as a fixed size cache), which can leave old data around for a long time if too large a size is chosen. The number of bytes needed is relatively simple to calculate, since this technique avoids the need to exclude caching of items not accessed more than once. However, with this technique, cache space can be used for items that are only accessed once.

In contrast, with repeat cacheable bytes, the cache size is limited based on how much cacheable content has been requested more than once (e.g., bytes accessed multiple times over the last X days). This may be a more efficient cache size since it corresponds to a smaller cache size limit of cacheable items that are accessed more than once. However, the technique may require that caching exclude items not repeatedly accessed so that space is reserved for those that are.

In further detail, to set a cache size based only upon repeat activity, it may be necessary to only cache repeat activity so that activity that is not repeated will not compete for cache space. This may require the ability to identify the items that should, or should not, go into the cache. Two possible approaches for doing this identification are: white list and black list. White list works by dynamically enabling the caching of items by identifying those that should be cached. Enabling caching can be based upon the request, such as explicit URLs or regular expression patterns. This technique is highly efficient since it allocates cache space only for items that have proven to need it. However, this adds lag time before an item is cached, so initial requests are missed opportunities.

By contrast, black list works by dynamically disabling the caching of items by identifying those that should not be cached. Caching can start out enabled for everything, and then disabling caching for items not seen again (e.g., never seen again or not seen within last X days). This technique immediately enables caching to maximize possible cache savings. On the other hand, the technique also enables caching of items (and, e.g., the storage/CPU overhead to manage the caching) that may not be requested again.

A related concern of efficient cache storage usage is the possibility of double caching (e.g., caching in both the central cache in the proxy server and an embedded cache within the app itself). If caching is enabled for an item in one cache, such as in the outer/downstream cache of proxy server 130, it may be desirable to disable caching in other caches, such as "upstream" in the cache of the app, so that there is only one cached copy of an item. There are different ways this can be supported, such as by setting HTTP response headers to indicate that the item cannot be cached upstream (e.g., via "Cache-Control" headers).

FIGS. 9-13 illustrate an example method of dynamically allocating caching space (dynamic cache allocation) according to an embodiment of the present invention. In FIGS. 9-13, particular steps are illustrated as taking place in a particular order. However, the present invention is not necessarily limited thereto, and in other embodiments, the steps may be in a different order (or possibly omitted) to accomplish the same or similar tasks as would be apparent to one of ordinary skill in the art. In addition, many of the steps in FIGS. 9-13 are presented in somewhat simplistic fashion, and may be implemented with more checks or considerations as discussed further below and would be apparent to one of ordinary skill.

The method of FIGS. 9-13 may be used to dynamically allocate caching space (e.g., into separate cache accounts (or caches), each potentially with their own caching policy) as a way to improve or optimize disk (or other nonvolatile storage) usage on a device with limited storage space. In this case, the effectiveness or value of a particular cache account and/or caching policy may be summarized as a single number (or a small group of numbers), which may be derived from one or more other values. One such number is the ratio of the number of bytes served from cache (i.e., network traffic saved) to the total number of bytes served to the app. Another such number is the ratio of the number of requests served from cache (i.e., roundtrips avoided) to the number of responses served to the app. For example, the ratio of network bytes or roundtrips saved may represent the effectiveness of caching an app for a given time window.

In FIGS. 9-13, Used Size refers to the number of bytes on disk used by the cache account while Allocated Size refers to the number of bytes to which the account is allowed to write. Once Used Size exceeds Allocated Size, files (or items) are deleted from the cache, according to one or more policies for ranking the value items in the cache. For example, a policy of valuing cached items higher based upon the frequency with which they were served from cache can be combined with a ranking of the least recently used items (as maintained in a least-recently-used list) to delete cached items once the Used Size exceeds the Allocated Size. Both Used Size and Allocated Size may vary during a particular time window depending on factors such as available cache storage space, current cache usage, and caching policy.

Continuing with FIGS. 9-13, Unique Bytes refers to the number of bytes for all unique requests seen during a time window, Bytes Served refers to the number of bytes served from the cache (for example, within a particular timeframe), Max Size refers to the maximum amount that the Allocated Size can be, and Min Size refers to the minimum amount that the Allocated Size can be. In addition, the use of "Total," such as Total Used Size, Total Allocated Size, etc., refers to the sum of the corresponding sizes for all the cache accounts.

For example, Max Size may be a default value (such as 50 megabytes (MB)), the current Used Size plus some percentage (such as 10%), the Unique Bytes, a maximum value for the allocated size of a cache account, such as to avoid allocating space beyond a size that is known to have minimal or negligible incremental value, or a combination (such as a maximum) of these or other possible maximum sizes. Likewise, Min Size may be a default value (such as 5 megabytes (MB)), the current Used Size, a minimum value for the allocated size of a cache account, such as to avoid reducing space below a size that is known to cause significant caching inefficiency, or a combination (such as a minimum) of these or other possible minimum sizes, including zero.

Further, in FIGS. 9-13, the Total Dynamic Cache Percent refers to a percentage of another value, such as free storage space (storage not presently used for app storage) or total storage space, to factor into the calculation of the total amount of storage space to allocate for caches. This percentage may represent, for example, a user configurable number, or a device or operating system configurable number, an administrator configured number, or a dynamically calculated number based upon an algorithm, heuristic, or policy (e.g., a number that increases if the user does not use free storage space over an extended period). In a similar fashion, the Total Dynamic Cache Size refers to the upper limit of the total space to allocate for all caches, e.g., as calculated from the above components, such as Total Dynamic Cache Percent. Thus, the Total Dynamic Cache Size can change over time depending on factors such as user input, other apps running on the device, etc. However, an underlying goal of the dynamic cache allocation of FIGS. 9-13 is to bring the Total Allocated Size in line with the Total Dynamic Cache Size.

Total Used Size, Total Allocated Size, and Total Max Size thus define three limits of total caching controlling the method of FIGS. 9-13, with Total Used Size≤Total Allocated Size≤Total Max Size. In an ideal case, the Total Dynamic Cache Size may equal the Total Allocated Size. However, the numbers vary dynamically with the caching activity. Thus, variables describing the total available cache storage level, such as the Total Dynamic Cache Size, can be described as being in one of four distinct ranges or the middle (e.g., ideal or goal) point: (1) greater than Total Max Size, (2) between Total Allocated Size (exclusive) and Total Max Size (inclusive), (3) equal to Total Allocated Size, (4) between Total Used Size (inclusive) and Total Allocated Size (exclusive), and (5) less than Total Used Size. Processing for case (1) is described in FIG. 9, case (2) in FIG. 10, case (4) in FIG. 11, and case (5) in FIGS. 12-13, with the ideal case (3) not requiring further processing.

In a similar fashion, Used Size, Allocated Size, and Max Size define three corresponding limits controlling the caching of a specific cache account, and observe the same relationship, Used Size≤Allocated Size≤Max Size, for each specific cache account (though with not necessarily the same values between different cache accounts). Thus, Used Size, Allocated Size, and Max Size can vary between different cache accounts.

Figure 9:
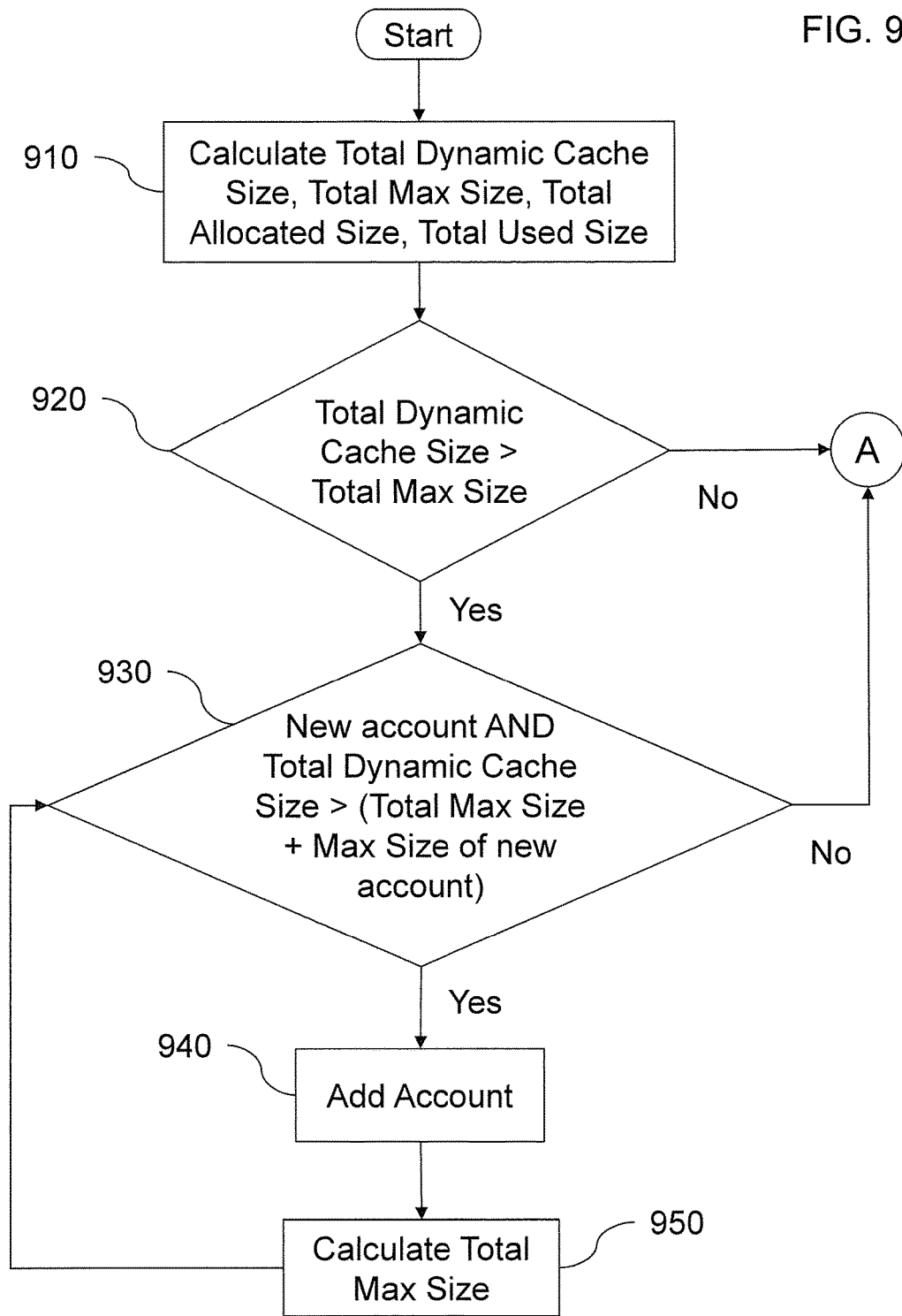
FIGS. 9-13 illustrate an example method of dynamically allocating caching space (dynamic cache allocation) according to an embodiment of the present invention.
Figure 10:
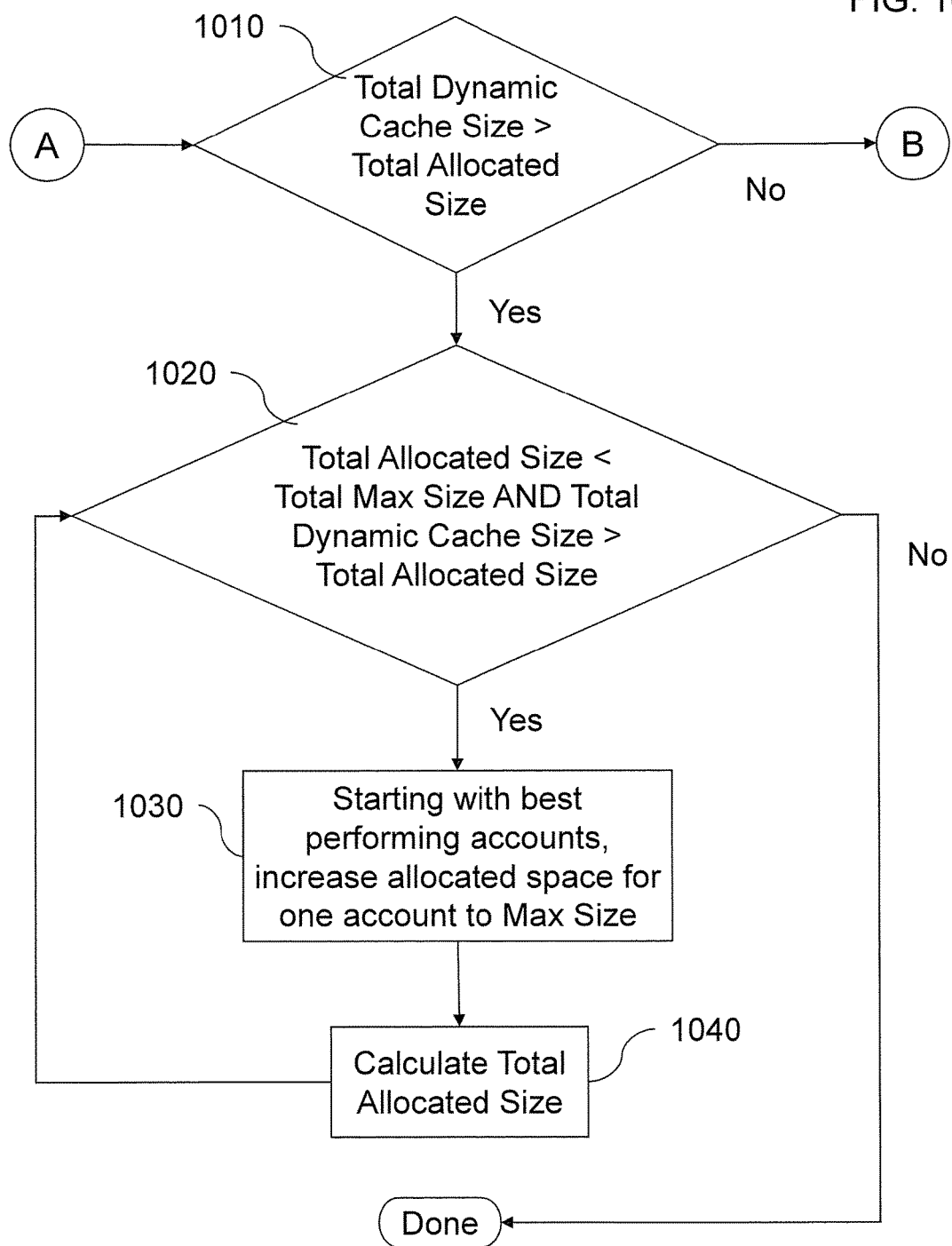

As an overview of FIGS. 9-13, when the Total Dynamic Cache Size is greater than the Total Max Size, more cache accounts can be added, as shown in FIG. 9. This cache account addition may be subject to eligibility requirements, such as only adding cache accounts for domains that have met certain criteria (for example, exceeding minimum amounts for number of cacheable bytes and number of requests seen). Likewise, when the Total Dynamic Cache Size is larger than the Total Allocated Size (and the Total Allocated Size is less than the Total Max Size), the allocated space for existing cache accounts may be increased, as shown in FIG. 10. For example, the allocated size for cache accounts may be increased starting with the cache accounts having the highest hit ratios and working downwards.

Figure 11:
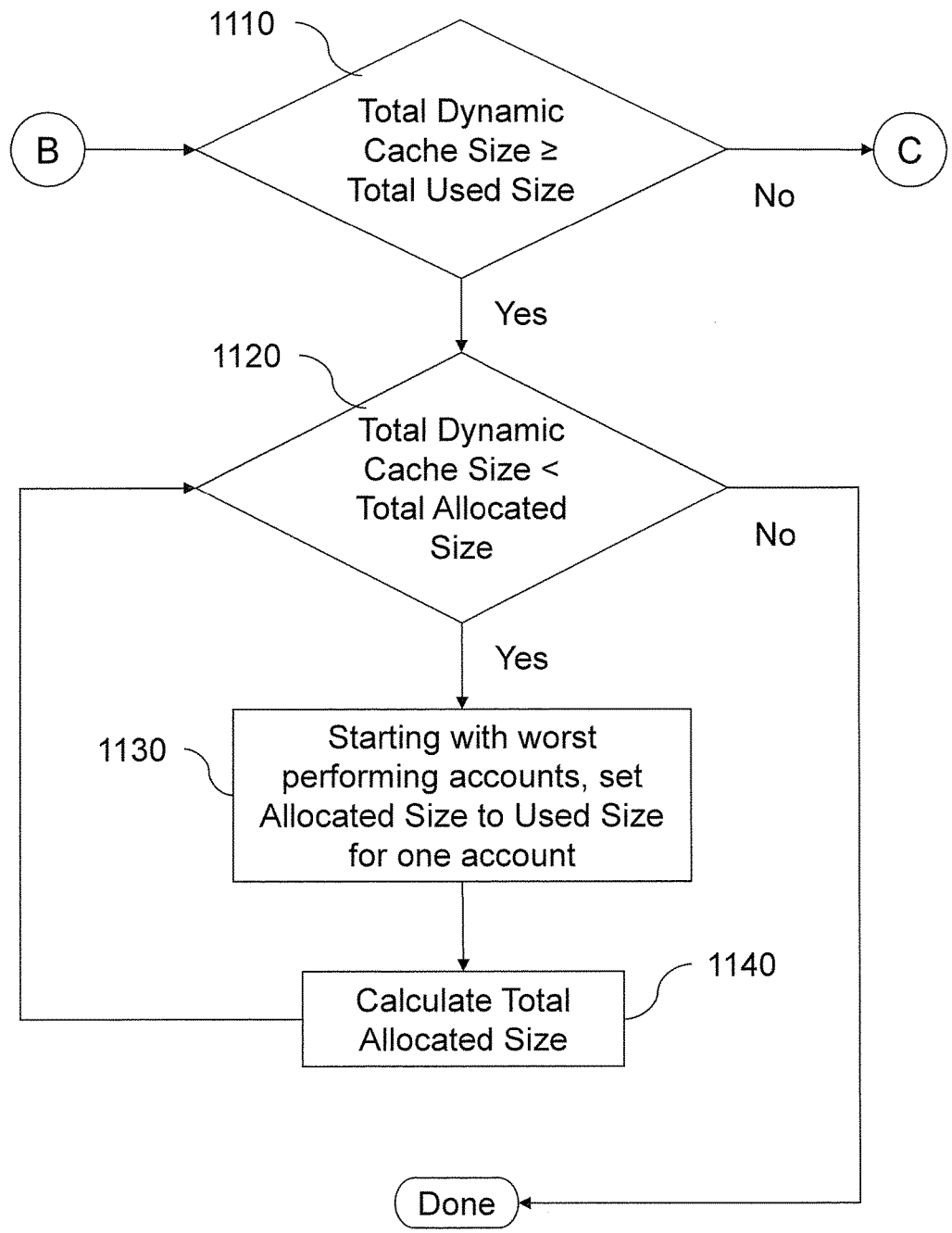
Figure 12:
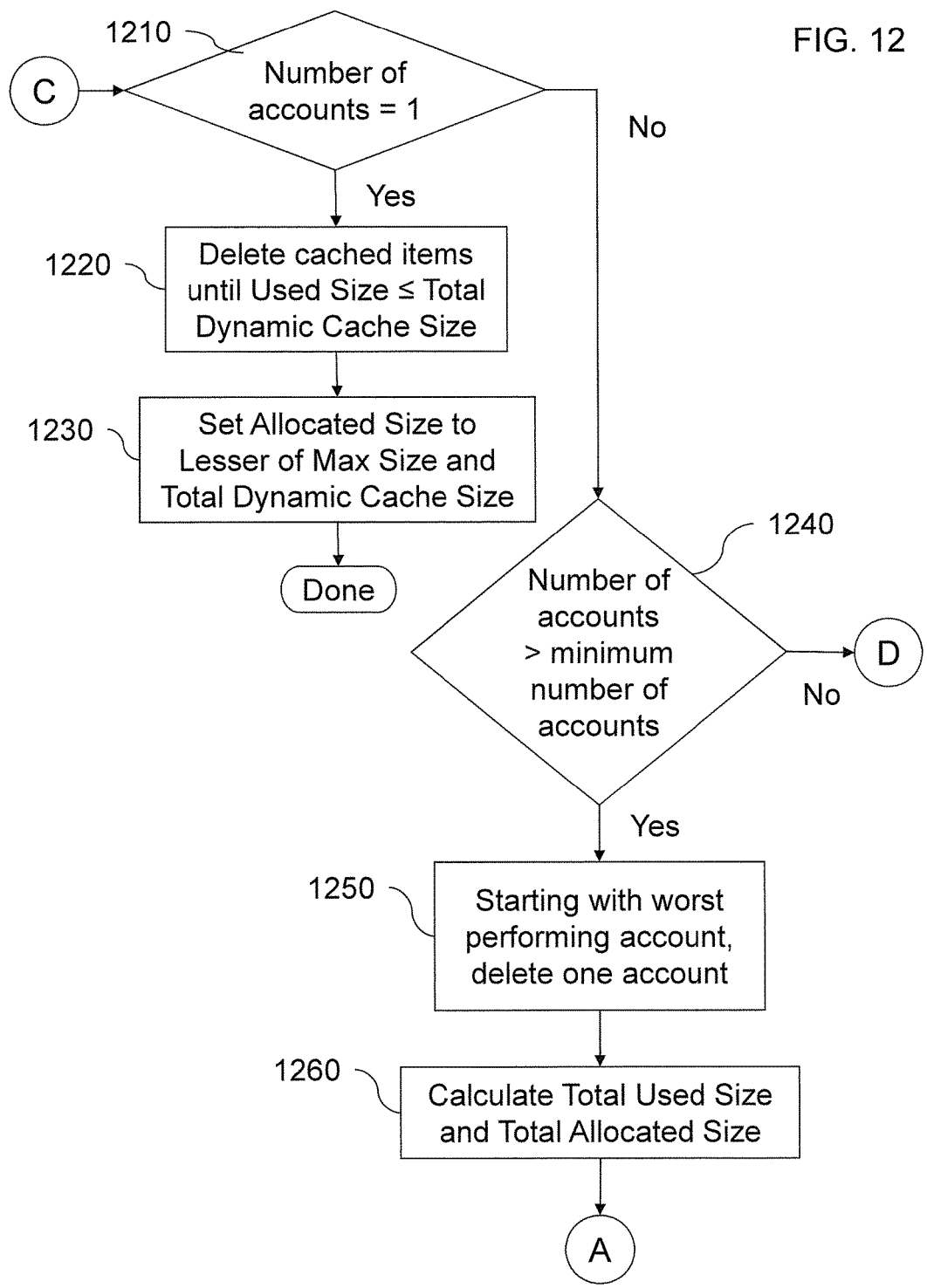
Figure 13:
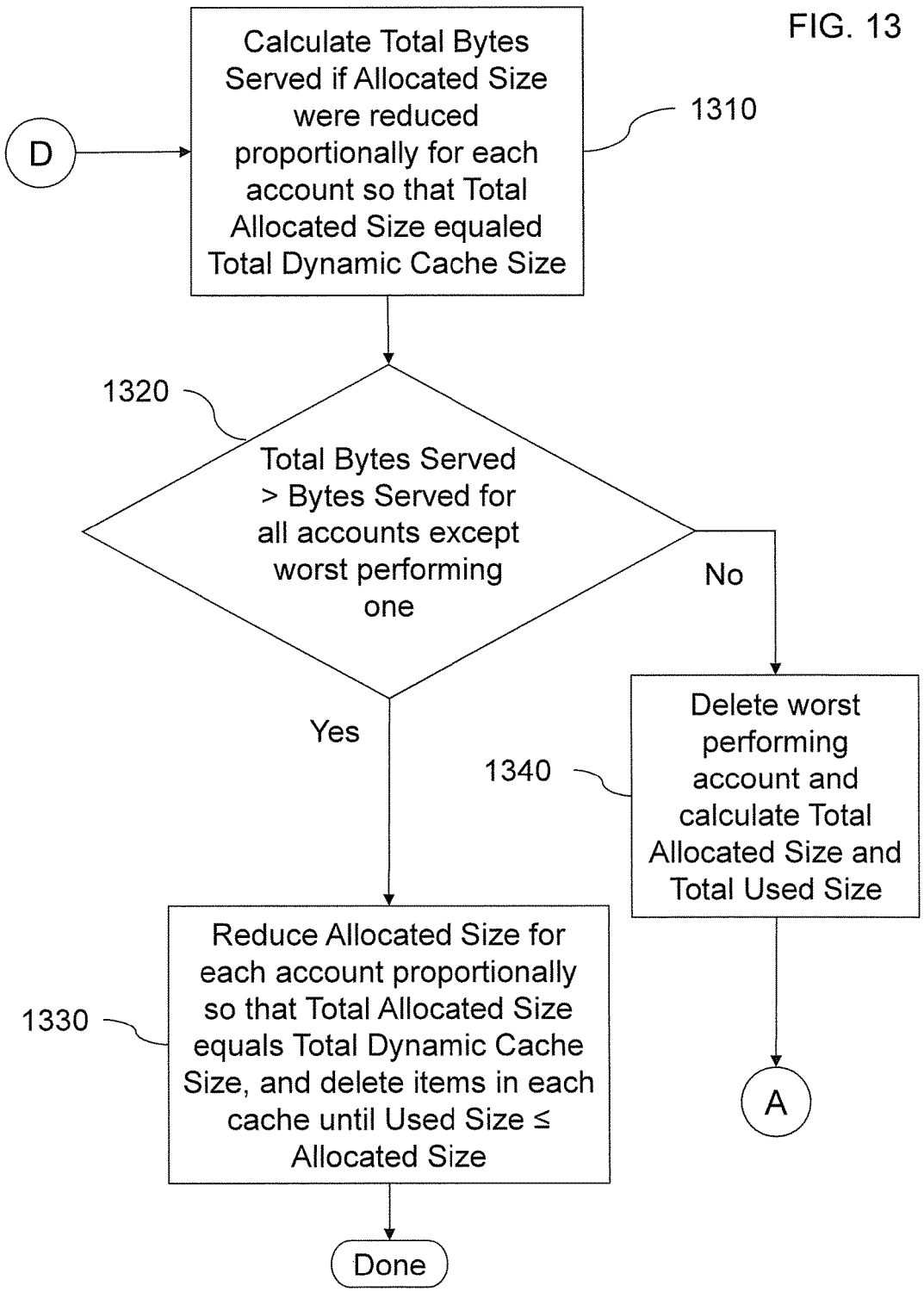

On the other hand, if the Total Dynamic Cache Size is less than the Total Allocated Size, but greater than (or equal to) the Total Used Size, the allocated space for existing cache accounts may be decreased, as shown in FIG. 11. For example, the allocated size for cache accounts may be decreased starting with the cache accounts having the lowest hit ratios and working upwards. In addition, when the Total Dynamic Cache Size is less than the Total Used Size, the cache accounts may be deleted or have their used space reduced, as shown in FIGS. 12-13.

With these principles in mind, consider the method of FIGS. 9-13. In FIG. 9, processing begins, and in step 910, the Total Dynamic Cache Size, Total Max Size, Total Allocated Size, and Total Used Size are calculated. The start of the processing in FIG. 9 may be triggered in one or more different ways, such as automatically when one or more of the totals changes, periodically according to a schedule or perhaps initiated manually such as by an administrator. In some embodiments, the calculation of some or all of these numbers may take place continuously (e.g., upon a change to any constituent component of one or more of the numbers), and step 910 may entail just referring to those continuously calculated numbers. In step 920, the Total Dynamic Cache Size is compared to the Total Max Size, and if the Total Dynamic Cache Size is greater than the Total Max Size, processing proceeds to step 930 to add more cache accounts. Otherwise, processing continues to FIG. 10 described below.

In step 930, if there is a new cache account to add (for example, a domain that is being tracked has met any necessary pre-caching criteria), the Total Dynamic Cache Size is compared to the Total Max Size plus the Max Size of the next new cache account. If the Total Dynamic Cache Size is greater than the Total Max Size plus the Max Size of the new cache account, then there is sufficient room to fully add the new cache account, so processing proceeds to step 940. Otherwise, there is no new cache account, or there is not sufficient caching space to add the new account, so processing continues to FIG. 10 (to make sure any unallocated space is allocated). In another embodiment, the new cache account may be added even when there is not sufficient caching space to hold Max Size (and there is sufficient caching space to hold Min Size), but the new cache account's allocated space is set to a sufficiently small number, such as the Total Dynamic Cache Size minus the Total Max Size (before adding the new cache account) to keep the Total Max Size from exceeding the Total Dynamic Cache Size.

In some embodiments, when new cache accounts are added, they are indicated specially. This is because new cache accounts may not have a sufficient history to establish a representative effectiveness value for the cache, such as a cache hit ratio, so that the system might otherwise delete them prematurely (for example, in FIG. 12 below). Once sufficient time has passed to generate a representative effectiveness value for the cache (e.g., a cache hit ratio), such as after a certain elapsed time has passed or a certain amount of domain activity has occurred (as would be apparent to one of ordinary skill), the special indication may be removed. However, in extreme shortages of caching space, even the specially indicated cache accounts may be eligible for deleting to free up caching space. The special indication may result in or take the form of a temporary artificial ranking value relative to other cache accounts, such as assigning a median or configurable cache hit ratio or other ranking values, so that this new cache account may be ranked higher than low performing existing accounts while also ranking lower than high performing existing accounts.

In step 940, the new cache account is added, with allocated space equal to Max Size (or, in another embodiment, to the lesser of Max Size and Total Dynamic Cache Size minus Total Max Size). In step 950, the Total Max Size is recalculated (e.g., to take into account the newly added cache account). Processing then returns to step 930 to continue adding more cache accounts (if possible) before proceeding to FIG. 10.

In FIG. 10, processing continues from FIG. 9 (or, as will be seen, from FIGS. 12 and 13 as well), and in step 1010, the Total Dynamic Cache Size is compared to the Total Allocated Size. If the Total Dynamic Cache Size is greater than the Total Allocated Size, then caching space is available for the cache accounts, so processing proceeds to step 1020 to increase the amount of allocated space. Otherwise, processing continues to FIG. 11 described below.

In Step 1020, the Total Allocated Size is compared to the Total Max Size and the Total Dynamic Cache Size is compared to the Total Allocated Size. If both the Total Allocated Size is less than the Total Max Size (that is, there is at least one cache account that has not been allocated space up to its Max Size) and the Total Dynamic Cache Size is greater than the Total Allocated Size (that is, there is still available caching space to back further allocations to a cache account), processing proceeds to step 1030 to select which allocated space is increased. Otherwise, there is no cache account whose allocated space can be increased or there is no more dynamic cache space with which to allocate more space to a cache account, so processing ends.

In step 1030, the allocated space is increased by selecting the cache account that is performing the best (and whose allocated space has not already reached Max Size), such as the cache account having the highest hit ratio (in terms of items served from cache), highest cache savings (in terms of bytes served from cache), largest increasing rate of change (in terms of hit ratio or cache savings), or a combination of these or other factors. The allocated space for this cache account is then increased, such as to the maximum possible, namely Max Size (or, in another embodiment, this increase is limited to no more than the Total Dynamic Cache Size minus the Total Allocated Size).

The maximum allocated cache space increase for the selected cache account may take place in one action, or over time as a series of increases, such as by a fixed configurable incremental value, a dynamic value based upon the account (e.g., a percentage of the current cache size), or by a value based upon a combination of these or other factors. Doing the increase in multiple steps may allow other cache accounts (such as other well performing cache accounts) to increase allocated space concurrently with the selected cache account, allow tracking of the selected cache account to be sure it is making efficient use of the added space before allocating any more space to it, etc.

Increasing the allocated space of the cache account that is performing the best is an attempt to devote more cache resources to the cache account that is deriving the most benefit from the cache, with the expectation that this selected cache account will derive even more benefit from the increased size. However, this is not always the case, and in some embodiments, there may be a maximum value (and that is factored into Max Size) for the allocated size of a cache account, such as to avoid allocating space beyond a size that is known to have minimal or negligible incremental value to the caching efficiency. In addition, doing the increases in smaller increments allows for more dynamic feedback in the process, by causing cache accounts that are not benefiting significantly from the increment to drop in caching efficiency and thus be less likely to get more caching space (or more likely to give up existing caching space).

In step 1040, the Total Allocated Size is calculated (this time taking into account the recently increased cache account). Processing then returns to step 1020, where the process is repeated until sufficient cache space is allocated (for example, resuming with the cache account having the next highest hit ratio (or otherwise next best caching performance) and whose allocated space has not already reached Max Size). The process terminates, for example, once all of the Total Dynamic Cache Size has been allocated to the cache accounts, or all of the cache accounts have had their allocated space increased to their corresponding Max Size, and/or when all cache accounts have been processed.

In FIG. 11, processing continues from FIG. 10, where it has already been determined that the Total Dynamic Cache Size is less than the Total Allocated Size, so allocated space needs to be reduced. In step 1110, the Total Dynamic Cache Size is compared to the Total Used Size. If the Total Dynamic Cache Size is at least as large as the Total Used Size, then sufficient caching space is available for existing usage for the cache accounts, so processing proceeds to step 1120 to decrease the amount of allocated, but yet unused, space. Otherwise, processing continues to FIG. 12 described below. In step 1120, the Total Dynamic Cache Size is compared to the Total Allocated Size. If the Total Dynamic Cache Size is less than the Total Allocated Size, processing proceeds to step 1130 to select which allocated space to reduce. Otherwise, the Total Dynamic Cache Size is at least the Total Allocated Size, so no further reduction of allocated space needs to take place and processing ends.

In step 1130, the allocated space is decreased by selecting the cache account that is performing the worst (and whose allocated space has not already been reduced to Used Size), such as the cache account having the lowest hit ratio (in terms of items served from cache), lowest cache savings (in terms of bytes served from cache), smallest increasing rate of change (or largest decreasing rate of change, in terms of hit ratio or cache savings), or a combination of these or other factors. The allocated space for this cache account is then decreased, such as to the minimum possible (and without discarding cache contents), namely Used Size (or, in another embodiment, this decrease is limited to no more than the Total Allocated Size minus the Total Dynamic Cache Size).

The maximum allocated cache space decrease for the selected cache account may take place in one action, or over time as a series of decreases, such as by a fixed configurable decremental value, a dynamic value based upon the account (e.g., a percentage of the current cache size), or by a value based upon a combination of these or other factors. Doing the decrease in multiple steps may allow other cache accounts (such as other poor performing cache accounts) to decrease allocated space concurrently with the selected cache account, allow tracking of the selected cache account to be sure it is continuing to make inefficient use of the decreased space before reducing any more space from it, etc.

Decreasing the allocated space of the cache account that is performing the worst is an attempt to devote fewer cache resources to the cache account that is deriving the least benefit from the cache, with the expectation that this selected cache account will not derive significantly less benefit from the decreased size. However, this is not always the case, and in some embodiments, there may be a minimum value (and that is factored into Min Size) for the allocated size of a cache account, such as to ensure there is sufficient space to hold a minimal amount of content, below which it may not be worthwhile to even have the cache. In addition, doing the decreases in smaller decrements allows for more dynamic feedback in the process, by causing cache accounts whose efficiency starts to improve after a decrement to be less likely to have more caching space reduced (or more likely to have caching space added).

In step 1140, the Total Allocated Size is calculated (this time taking into account the recently decreased cache account). Processing then returns to step 1120, where the process is repeated until sufficient allocated, but unused, cache space is released (for example, resuming with the cache account having the next lowest hit ratio and whose allocated space has not already been reduced to Used Size). The process terminates once the total allocated space of all of the cache accounts has been reduced to no more than the Total Dynamic Cache Size, or all of the cache accounts have had their allocated space decreased to their corresponding Min Size, and/or when all cache accounts have been processed.

In FIG. 12, processing continues from FIG. 11, where it has already been determined that the Total Dynamic Cache Size is less than the Total Used Size, so cached items need to be deleted to reduce the amount of used space in the cache. First, the special case of only one cache account is addressed. In step 1210, if the number of cache accounts is one, processing proceeds to step 1220 to handle the special case. Otherwise, processing proceeds to step 1240 to handle multiple cache accounts. In step 1220, items are deleted from the one cache account until the Used Size is no longer larger than the Total Dynamic Cache Size. In step 1230, the Allocated Size is set to the lesser of the Max Size or the Total Dynamic Cache Size, and processing ends.

If there are multiple cache accounts, a check is first made in step 1240 to see if the less efficient cache accounts should be completely removed. In step 1240, some criteria is chosen, such as comparing the number of cache accounts to a minimum number of cache accounts, or Total Min Size is compared to the Total Dynamic Cache Size, or some combination of these or other criteria are used. Here, the minimum number of cache accounts may represent a minimum number of domains to cache, above which it is all right to unconditionally delete less efficient caches, but below which it may be more effective to reduce the sizes of the remaining caches rather than the total number of caches. If there are more cache accounts than this minimum number, or Total Min Size exceeds the Total Dynamic Cache Size, then there are an excess number of cache accounts for the available caching space, so processing proceeds to step 1250 to decrease the number of cache accounts. Otherwise, processing continues to FIG. 13 described below.

In other embodiments, there may be other factors used to select accounts that can be unconditionally deleted, such as being forced to reduce a cache account below a particular size (e.g., a size below which the cache is likely to be ineffective, such as Min Size), or when the caching performance of the cache account drops below one or more measures of effectiveness (e.g. cache hit ratio, bytes saved, etc.). For example, cache accounts that do not serve a minimum level of requests or bytes from cache within a recent timeframe may be selected for deletion.

In step 1250, the used space is decreased by deleting the cache account having, for example, the lowest hit ratio (or the worst performing cache account, such as measured by criteria discussed above). In step 1260, the Total Used Size and Total Allocated Size are recalculated (this time taking into account the recently deleted cache account). Processing then returns to FIG. 10, to retry bringing the Total Allocated Size in line with the Total Dynamic Cache Size in light of the recently deleted cache account.

In FIG. 13, processing continues from FIG. 11, where it has already been determined that the Total Dynamic Cache Size is less than the Total Used Size, and the number of cache accounts is not more than the minimum number of domains to cache (or other criteria, such as the Total Dynamic Cache Size is at least Total Min Size, are met), so cached items need to be deleted from the caching storage, but without unconditionally deleting entire cache accounts. Accordingly, in the embodiment of FIG. 13, two alternatives are considered (by way of example): (1) reducing the allocated (and, by extension, used) space proportionally among the remaining cache accounts so that the Total Dynamic Cache Size now equals the Total Used Size, or (2) deleting the cache account that is performing the worst, such as the cache account with the lowest hit ratio (as in steps 1250-1260 of FIG. 12 above). The alternative that frees the most cache space without compromising the caching performance is selected.

The proportionality applied to the cache accounts in alternative (1) may be constant or variable, such as using a proportionality coefficient that varies according to an aspect of each cache (e.g., hit ratio, bytes served, etc.), so that the proportional reduction may be higher for low performing caches and lower for high performing caches. Accordingly, in step 1310, the Total Bytes Served is recalculated assuming a proportional reduction in each Allocated Size sufficient to bring the Total Allocated Size down to the Total Dynamic Cache Size. While a precise number for this recalculated Total Bytes Served may require a caching simulator, the recalculated Total Bytes Served can be instead approximated by proportionally reducing the Bytes Served for each cache by the same amount of the Allocated Size reduction. In step 1320, this recalculated Total Bytes Served is compared to the sum of all the (unreduced) Bytes Served for all the cache accounts except the one with the lowest hit ratio. The goal of this test is to decide which of the two above alternatives to select.

If the recalculated Total Bytes Served is greater than the sum of the Bytes Served for all but the cache account with the lowest hit ratio, processing proceeds to step 1330 to carry out the proportional reduction of all the cache accounts. That is, it appears that overall caching performance will be better served by a proportional reduction to the existing cache accounts than the deletion of an entire cache account. Otherwise, processing proceeds to step 1340 to delete the worst performing cache account (such as the account with the lowest hit ratio), which is similar to steps 1250-1260 in FIG. 12, so further description will not be repeated. In step 1330, the Allocated Size for each cache account is reduced proportionally so that the Total Allocated Size equals the Total Dynamic Cache Size. Then sufficient items are deleted from each cache account so that Used Size is no longer greater than the newly reduced Allocated Size, and which point processing ends.

Thus, in the method of FIGS. 9-13, the Total Dynamic Cache Size is allowed to vary dynamically, and the cache accounts adjust accordingly to keep the Total Allocated Size in line with the Total Dynamic Cache Size. This may include adding more cache accounts (FIG. 9) or increasing allocated space to the existing cache accounts (FIG. 10) when the Total Dynamic Cache Size grows, or reducing the allocated space to the existing cache accounts (FIGS. 11 and 13), deleting cache accounts (FIGS. 12 and 13), and/or deleting cached items from the cache accounts (FIGS. 12 and 13) when the Total Dynamic Cache Size shrinks. In particular, the choice of whether to delete a cache account or reduce the allocated space of the existing cache accounts is made based on how well the lowest performing (e.g., lowest hit ratio or other criteria) cache account is performing relative to the other cache accounts.

It should be noted that modifications may be made to the above method of FIGS. 9-13 as would be apparent to one of ordinary skill. For example, in FIG. 13, the worst performing cache account (e.g., the account with the lowest hit ratio) may be too small to completely relieve the caching storage shortage, in which case it may be better to replace the worst performing cache account in steps 1320 and 1340 with a number of low performing cache accounts (for example, the two worst performing cache accounts, such as the cache accounts having the two lowest hit ratios, in place of just the worst performing cache account). This concept could be extended to the point of excluding all but the best performing cache account (for example, the account with the highest hit ratio), such as in cases of extreme caching storage shortage, when making the test in step 1320 or doing the processing of step 1340.

As another example, the unconditional deletion in FIG. 12 may be performed even when Total Dynamic Cache Size is greater than Total Used Size, such as to ensure the removal of any cache account that is performing below a minimal threshold (e.g. hit ratio, bytes served), which avoids the overhead of caching for a domain that never benefits sufficiently from having a cache.

FIG. 14 is an example dynamic caching organization 1400 according to an embodiment of the present invention. FIG. 14 shows some of the more significant components of the organization 1400, such as a network activity statistics gathering module 1410, a repeat activity statistics gathering module 1420, a dynamic cache account management module 1430, and a caching statistics storage 1440. These and other modules in embodiments of the present invention may be implemented, for example, in hardware or software, such as computer instructions designed to run on (e.g., be executed by) a general purpose or specialized processor as would be apparent to one of ordinary skill. Further, the caching statistics storage 1440 may be maintained, for example, on a nonvolatile storage device (such as a disk or flash drive) and/or volatile storage (such as RAM).

The network activity statistics gathering module 1410 does a high level gathering of network activity for apps. When a new app is started (or a new web site visited, or any other potential cacheable activity, which will be referred to in general as "app"), the network activity statistics gathering module 1410 starts a set of counters, such as cacheable requests or bytes transferred. For example, the new app could be added to the tracking tables described in FIG. 2, and the app's activity tracked during an initial period (e.g., a T1 period, as described in the method of FIG. 3) to see if the app would be a potential candidate for dynamic cache management or repeat activity statistics gathering. These counters and tracking tables may be stored, for example, in the caching statistics storage 1440. If the new app appears to be a promising candidate for dynamic cache management or repeat activity statistics gathering (e.g., its cacheable request count or bytes transferred exceed thresholds, such as set or predetermined thresholds, during the T1 period), the app may be passed to the repeat activity statistics gathering module 1420 for more intensive statistics gathering.

Depending on the statistics obtained, the network activity statistics gathering module 1410 may continue to accumulate network activity statistics for an app even after the app has been identified as a candidate for dynamic cache management or repeat activity statistics gathering. For example, the network activity statistics gathering module 1410 may start another T1 tracking period for the app. Because of the dynamic nature of network activity, and the relatively low overhead of basic network activity counting (e.g., cacheable requests or bytes transferred), it may be beneficial to continue monitoring most or all of the apps being considered for dynamic cache management by the network activity statistics gathering module 1410.

The repeat activity statistics gathering module 1420 simulates caching behavior of apps being considered for dynamic cache management. For example, the repeat activity statistics gathering module 1420 may use the tracking tables of FIG. 2 and the methods of tracking repeat activity in FIGS. 3-7 to determine if a candidate app identified by the network activity statistics gathering module 1410 would be suitable for dynamic cache management. That is, by tracking apparent repeat request activity (e.g., repeat requests and response bytes transferred) using tracking tables and request and/or response tables (that may be stored, for example, in the caching statistics storage 1440) for the app over a tracking period (e.g., a T2 period, as described in the method of FIG. 3), the repeat activity statistics gathering module 1420 may identify if the app would appear to benefit from dynamic cache management.

For example, if the repeat requests or bytes transferred for the app during the T2 period exceeds set or predetermined thresholds, the repeat activity statistics gathering module 1420 may pass the app to the dynamic cache account management module 1430 or put the app on a list of apps (for example, maintained in the caching statistics storage 1440) suitable for dynamic cache management.

Unlike the network activity statistics gathering module 1410, the gathering of repeat activity statistics by the repeat activity statistics gathering module 1420 is significantly more computationally and storage intensive than basic network activity statistics gathering. Because of this, the repeat activity statistics gathering module 1420 may monitor only a few apps at a time, to better maintain a representative and current list of apps that would benefit from dynamic cache management by the dynamic cache account management module 1430. For example, the repeat activity statistics gathering module 1420 may initiate repeat activity tracking for an app/site based upon the cacheability of the requests determined by the network activity statistics gathering module 1410 (such as during a recent T1 period), and then for the apps/sites it is tracking repeat activity, it can maintain a dynamic and sorted list of the best (and presently uncached) apps for dynamic cache management based on statistics such as their repeat requests and bytes transferred over a recent period (such as a recent T2 period).

The dynamic cache account management module 1430 manages the actual caching of apps identified by the network activity statistics gathering module 1410, the repeat activity statistics gathering module 1420, or a combination thereof, as being likely to benefit from caching. The dynamic cache account management module 1430 allocates and maintains the caches 1450 for apps or web sites based on the caching statistics 1440, as well as other possible factors, such as rules provided by an administrator for what apps/sites are and are not allowed to be cached. For example, the dynamic cache account management module 1430 may employ techniques such as those described above with reference to FIGS. 9-13.

The dynamic cache account management module 1430 may also maintain actual statistics of caching behavior, such as stored in the caching statistics storage 1440 (e.g., cache size, actual number of repeat requests and bytes transferred, cache hit ratio, etc.), for example, to better manage the current apps being cached, identify those apps that may not (or may no longer) benefit from caching as well as those apps that benefit significantly from caching. These statistics may be maintained in the caching statistics storage 1440 to assist the dynamic cache account management module 1430 (and the other modules 1410 and 1420) in deciding which apps to cache (or track) and what adjustments (e.g., cache sizes) should be made to such apps.

Further embodiments of the present invention are directed toward network management. Managing network activity may make use of tools to monitor/identify bandwidth usage and tools to control/adjust that usage. By being "in band" for network activity on the phone, embodiments of the present invention can monitor resource usage for that activity (e.g., bandwidth, battery, CPU, cellular connections, etc.) and associate that activity with very detailed information that is often not available further downstream in the network. Examples of such data analytics include bandwidth usage, cellular connection state, performance, and battery usage.

Bandwidth usage refers to tracking bandwidth usage for each target/destination domain for each app, since the same domain can be accessed by multiple apps. This may be tracked, for example, for both in data (received from a remote server) and out data (sent to a remote server). This may be tracked in terms of total bandwidth (network and cache) versus network/cache. The proxy server may see connection-level details, such as the TCP port number, which can be associated with per-process connection information provided by the OS (e.g., Android exposes this in /proc/net files), and thus activity can be tracked for a specific app/process running on the device.

Cellular connection state refers to tracking how often or how much the cellular network is "connected" since this is a limited/shared resource among other users in the cell site. For example, this may be tracked in terms of how often the connection state changes (e.g., disconnected, connected, dormant, suspended). This may also be tracked in teens of how long the connection states remains "connected." This value may be associated with the bandwidth data, such as to determine whether increased caching reduces total connection time, as well as being associated with specific apps/processes running on the device.

Performance refers to measuring performance-related status, such as time per request or bytes per second, which may be required for various network-related activity, such as HTTP requests or browser page load times. Embodiments may measure throughput separately for different ways that requests are handled, such as entirely from the network, entirely from cache, from cache after server revalidation, etc.

Battery usage refers to tracking how much battery is used for network activity, such as by domain or app. In one embodiment, the battery level is measured before and after each request. In further detail, the battery usage may be measured by domain, app, content type, Wi-Fi versus cellular, etc.

1. Network Access Policy

By being "in band" for network activity on the phone, embodiments of the present invention can control and/or limit network activity, particularly in ways that may not be possible when implemented in the network. For example, policy implemented at the device can provide control that covers the different network types that can be accessed by a user, including those not controlled by the wireless carrier or enterprise, such as WiFi networks.

Some of the example network access policies include monitoring or blocking objectionable content, and monitoring or blocking information leakage. With monitoring or blocking objectionable content, access to objectionable content, such as porn or even ads, can be detected or blocked across the different networks accessed by the device, such as based upon the request, destination server, and/or content type. One method to do this is to maintain a list of request parameters, such as URL patterns or hostnames, which is checked for all requests. Other ways to detect include matching key words in the content, such as in the HTML for a web page, or matching image patterns in pictures or videos.

With monitoring or blocking information leakage, unexpected or undesired transmission of information can be blocked, such as based upon the request contents or destination server. One method to do this is to maintain a list of request parameters, such as URL patterns or hostnames (e.g., known malware/phishing servers), that is checked for all requests. Another way to detect is to match patterns in the request content, such as looking for social security numbers or email addresses.

Managing these network access policies may involve a lot of overhead. For example, maintaining the network access policy information at the device can constitute a large amount of content/metadata that needs to be kept up to date, such as a global list of domains/servers hosting porn or known malware/phishing web sites. To efficiently maintain this information, one or more of the following approaches may be taken: checking for and processing changes at a centralized server or management console, where it can efficiently calculate/compress/distribute updates to devices, or hashing request information into a shortened "lookup key", such as the same one used to look up responses stored in the cache.

While the present invention has been described in connection with certain example embodiments, it is to be understood that the invention is not limited to the disclosed embodiments, but, on the contrary, is intended to cover various modifications and equivalent arrangements as would be apparent to one of ordinary skill in the art without departing from the spirit and scope of the invention as defined by the following claims, and equivalents thereof.

What is claimed is:

1. A system for dynamic caching of content of sites accessed over a network by a user, the system comprising:
    a processor;
    a first storage device for maintaining a plurality of caches for storing the content of the sites accessed over the network by the user based on activity over the network by the user with the sites;
    a second storage device for storing statistics; and
    a non-transitory physical medium, wherein the medium has instructions stored thereon that, when executed by the processor, causes the processor to:
        gather statistics on suitability of the sites for caching based on user activity;
        store the caching suitability statistics on the second storage device; and
        dynamically create, delete, or resize the caches based on the caching suitability statistics.

2. The system of claim 1, wherein
    the caching suitability statistics comprise statistics of cacheable activity with the sites by the user, and
    the instructions, when executed by the processor, further cause the processor to dynamically create the caches based on the cacheable activity statistics.

3. The system of claim 2, wherein the cacheable activity statistics comprise cacheable requests with the sites by the user or cacheable bytes of the network activity corresponding to the cacheable requests.

4. The system of claim 1, wherein:
    the caching suitability statistics comprise statistics of cacheable activity with the sites by the user,
    the instructions, when executed by the processor, further cause the processor to dynamically create the caches based on the cacheable activity statistics,
    the cacheable activity statistics comprise cacheable requests with the sites by the user or cacheable bytes of the network activity corresponding to the cacheable requests,
    the caching suitability statistics further comprise statistics of repeat activity with the sites by the user,
    the repeat activity statistics comprise repeat requests with the sites by the user, and
    the instructions, when executed by the processor, further cause the processor to:
        identify top ones of the sites based on the caching suitability statistics, and
        track the repeat requests for the top ones of the sites.

5. The system of claim 4, wherein the instructions, when executed by the processor, further cause the processor to identify the top ones of the sites based on the cacheable requests.

6. The system of claim 4, wherein the instructions, when executed by the processor, further cause the processor to identify the top ones of the sites based on the cacheable bytes.

7. A system for dynamic caching of content of sites accessed over a network by a user, the system comprising:
    a processor;
    a first storage device for maintaining a plurality of caches for storing the content of the sites accessed over the network by the user based on activity over the network by the user with the sites;
    a second storage device for storing statistics; and
    a non-transitory physical medium, wherein the medium has instructions stored thereon that, when executed by the processor, causes the processor to:
        gather statistics on suitability of the sites for caching based on the network activity;
        store the caching suitability statistics on the second storage device; and
        dynamically create, delete, or resize the caches based on the caching suitability statistics,
    wherein
    the caching suitability statistics further comprise statistics of repeat activity with the sites by the user, and
    the repeat activity statistics comprise repeat requests with the sites by the user.

8. The system of claim 7, wherein the instructions, when executed by the processor, further cause the processor to
    identify top ones of the sites based on the caching suitability statistics, and
    track the repeat requests for the top ones of the sites.

9. The system of claim 8, wherein
    the caching suitability statistics comprise statistics of cacheable activity with the sites by the user;
    the instructions, when executed by the processor, further cause the processor to dynamically create the caches based on the cacheable activity statistics;
    the cacheable activity statistics comprise cacheable requests with the sites by the user; and
    the instructions, when executed by the processor, further cause the processor to identify the top ones of the sites based on the cacheable requests.

10. The system of claim 8, wherein:
    the caching suitability statistics comprise statistics of cacheable activity with the sites by the user;
    the instructions, when executed by the processor, further cause the processor to dynamically create the caches based on the cacheable activity statistics;
    the cacheable activity statistics comprise cacheable requests with the sites by the user or cacheable bytes of the network activity corresponding to the cacheable requests; and
    the instructions, when executed by the processor, further cause the processor to identify the top ones of the sites based on the cacheable bytes.

11. A system for dynamic caching of content of sites accessed over a network by a user, the system comprising:
    a processor;
    a first storage device for maintaining a plurality of caches for storing the content of the sites accessed over the network by the user based on activity over the network by the user with the sites;
    a second storage device for storing statistics; and
    a non-transitory physical medium, wherein the medium has instructions stored thereon that, when executed by the processor, causes the processor to:
        gather statistics on suitability of the sites for caching based on the network activity;
        store the caching suitability statistics on the second storage device; and
        dynamically create, delete, or resize the caches based on the caching suitability statistics,
    wherein the caching suitability statistics comprise statistics of repeat activity with the sites by the user, and wherein the instructions, when executed by the processor, further cause the processor to dynamically create the caches based on the repeat activity statistics.

12. The system of claim 11, wherein the repeat activity statistics comprise repeat requests with the sites by the user.

13. The system of claim 12, wherein the instructions, when executed by the processor, further cause the processor to
identify top ones of the sites based on the caching suitability statistics, and
track the repeat requests for the top ones of the sites.

14. The system of claim 13, wherein
the caching suitability statistics further comprise statistics of cacheable activity with the sites by the user, and
the instructions, when executed by the processor, further cause the processor to identify the top ones of the sites based on the cacheable activity statistics.

15. The system of claim 14, wherein
the cacheable activity statistics comprise cacheable requests with the sites by the user or cacheable bytes of the network activity corresponding to the cacheable requests, and
the instructions, when executed by the processor, further cause the processor to identify the top ones of the sites based on the cacheable requests.

16. The system of claim 14, wherein
the cacheable activity statistics comprise cacheable requests with the sites by the user or cacheable bytes of the network activity corresponding to the cacheable requests, and
the instructions, when executed by the processor, further cause the processor to identify the top ones of the sites based on the cacheable bytes.

17. A method of dynamic caching of content of sites accessed over a network by a user, the method comprising:
executing, by a processor, instructions stored on a non-transitory physical medium;
maintaining, by the processor on a first storage device, a plurality of caches for storing the content of the sites accessed over the network by the user based on activity over the network by the user with the sites;
storing statistics by the processor on a second storage device;
gathering, by the processor, statistics on suitability of the sites for caching based on user activity;
storing, by the processor, the caching suitability statistics on the second storage device; and
dynamically creating, deleting, or resizing, by the processor, the caches based on the caching suitability statistics.

18. The method of claim 17, wherein
the caching suitability statistics comprise statistics of cacheable activity with the sites by the user, and
the method further comprises dynamically creating, by the processor, the caches based on the cacheable activity statistics.

19. The method of claim 18, wherein the cacheable activity statistics comprise cacheable requests with the sites by the user or cacheable bytes of the network activity corresponding to the cacheable requests.

20. The method of claim 17, wherein:
the caching suitability statistics comprise statistics of cacheable activity with the sites by the user,
the method further comprises dynamically creating, by the processor, the caches based on the cacheable activity statistics,
the cacheable activity statistics comprise cacheable requests with the sites by the user or cacheable bytes of the network activity corresponding to the cacheable requests,
the caching suitability statistics further comprise statistics of repeat activity with the sites by the user,
the repeat activity statistics comprise repeat requests with the sites by the user, and
the instructions, when executed by the processor, further cause the processor to:
identify top ones of the sites based on the caching suitability statistics, and
track the repeat requests for the top ones of the sites.

21. The method of claim 20, further comprising identifying, by the processor, the top ones of the sites based on the cacheable requests.

22. The method of claim 20, further comprising identifying, by the processor, the top ones of the sites based on the cacheable bytes.

23. A method of dynamic caching of content of sites accessed over a network by a user, the method comprising:
executing, by a processor, instructions stored on a non-transitory physical medium;
maintaining, by the processor on a first storage device, a plurality of caches for storing the content of the sites accessed over the network by the user based on activity over the network by the user with the sites;
storing statistics by the processor on a second storage device;
gathering, by the processor, statistics on suitability of the sites for caching based on the network activity;
storing, by the processor, the caching suitability statistics on the second storage device; and
dynamically creating, deleting, or resizing, by the processor, the caches based on the caching suitability statistics,
wherein
the caching suitability statistics further comprise statistics of repeat activity with the sites by the user, and
the repeat activity statistics comprise repeat requests with the sites by the user.

24. The method of claim 23, further comprising:
identifying, by the processor, top ones of the sites based on the caching suitability statistics; and
tracking, by the processor, the repeat requests for the top ones of the sites.

25. The method of claim 24, wherein
the caching suitability statistics comprise statistics of cacheable activity with the sites by the user,
the method further comprises dynamically creating, by the processor, the caches based on the cacheable activity statistics,
the cacheable activity statistics comprise cacheable requests with the sites by the user or cacheable bytes of the network activity corresponding to the cacheable requests,
the method further comprises identifying, by the processor, the top ones of the sites based on the cacheable requests.

26. The method of claim 24, wherein
the caching suitability statistics comprise statistics of cacheable activity with the sites by the user,
the method further comprises dynamically creating, by the processor, the caches based on the cacheable activity statistics, the cacheable activity statistics comprise cacheable requests with the sites by the user or cacheable bytes of the network activity corresponding to the cacheable requests, the method further comprises identifying, by the processor, the top ones of the sites based on the cacheable bytes.

27. A method of dynamic caching of content of sites accessed over a network by a user, the method comprising:

executing, by a processor, instructions stored on a non-transitory physical medium;

maintaining, by the processor on a first storage device, a plurality of caches for storing the content of the sites accessed over the network by the user based on activity over the network by the user with the sites;

storing statistics by the processor on a second storage device;

gathering, by the processor, statistics on suitability of the sites for caching based on the network activity;

storing, by the processor, the caching suitability statistics on the second storage device; and dynamically creating, deleting, or resizing, by the processor, the caches based on the caching suitability statistics, wherein the caching suitability statistics comprise statistics of repeat activity with the sites by the user, and wherein the method further comprises dynamically creating, by the processor, the caches based on the repeat activity statistics.

28. The method of claim 27, wherein the repeat activity statistics comprise repeat requests with the sites by the user.

29. The method of claim 28, further comprising:
identifying, by the processor, top ones of the sites based on the caching suitability statistics; and
tracking, by the processor, the repeat requests for the top ones of the sites.

30. The method of claim 29, wherein
the caching suitability statistics comprise statistics of cacheable activity with the sites by the user, and
the method further comprises identifying, by the processor, the top ones of the sites based on the cacheable activity statistics.

31. The method of claim 30, wherein
the cacheable activity statistics comprise cacheable requests with the sites by the user or cacheable bytes of the network activity corresponding to the cacheable requests, and
the method further comprises identifying, by the processor, the top ones of the sites based on the cacheable requests.

32. The method of claim 30, wherein
the cacheable activity statistics comprise cacheable requests with the sites by the user or cacheable bytes of the network activity corresponding to the cacheable requests, and
the method further comprises identifying, by the processor, the top ones of the sites based on the cacheable bytes.

* * * * *